(12) United States Patent
Horigome et al.

(10) Patent No.: US 11,698,125 B2
(45) Date of Patent: Jul. 11, 2023

(54) JIG SUPPORTING REDUCTION GEAR OF ROBOT AND METHOD OF REPLACING REDUCTION GEAR USING JIG

(71) Applicant: FANUC CORPORATION, Yamanashi (JP)

(72) Inventors: Atsushi Horigome, Yamanashi (JP); Masashi Ooe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 430 days.

(21) Appl. No.: 16/838,027

(22) Filed: Apr. 2, 2020

(65) Prior Publication Data

US 2020/0318726 A1 Oct. 8, 2020

(30) Foreign Application Priority Data

Apr. 4, 2019 (JP) ................................. 2019-072307

(51) Int. Cl.
*F16H 57/023* (2012.01)
*B25J 9/10* (2006.01)
*F16H 57/00* (2012.01)

(52) U.S. Cl.
CPC ............ *F16H 57/023* (2013.01); *B25J 9/102* (2013.01); *F16H 2057/0062* (2013.01)

(58) Field of Classification Search
CPC ................... F16H 2057/0062; F16H 57/023
USPC ....................................................... 29/893.2
See application file for complete search history.

(56) References Cited

U.S. PATENT DOCUMENTS 8,464,413 B1  6/2013  Prater et al.
2019/0262953 A1* 8/2019  Mori ....................... B23P 19/10

FOREIGN PATENT DOCUMENTS

| CN | 107053255 | A |   | 8/2017 |
| JP | H1295790  | A |   | 11/1989 |
| JP | H5116091  | A |   | 5/1993 |
| JP | H5318379  | A |   | 12/1993 |
| JP | 2002336307 | A | * | 11/2002 |
| JP | 2002336307 | A |   | 11/2002 |
| JP | 2004291116 | A |   | 10/2004 |
| JP | 2013-78815 | A |   | 5/2013 |
| JP | 2015120205 | A |   | 7/2015 |
| JP | 2018187711 | A |   | 11/2018 |
| JP | 2019142702 | A |   | 8/2019 |

* cited by examiner

*Primary Examiner* — Randell J Krug
(74) *Attorney, Agent, or Firm* — Hauptman Ham, LLP

(57) ABSTRACT

There is a demand for further improving efficiency of a task of replacing the reduction gear of the robot. A jig configured to support a reduction gear connecting a first element and a second element of a robot to be enabled to perform a speed reduction operation on each other, when the second element is separated from the first element includes a fixed portion removably mounted to the first element or the second element, a movable portion rotationally or translationally movably mounted to the fixed portion, and a support mounted to the movable portion and configured to suspend and support the reduction gear in a gravity direction.

10 Claims, 17 Drawing Sheets

JIG SUPPORTING REDUCTION GEAR OF ROBOT AND METHOD OF REPLACING REDUCTION GEAR USING JIG

RELATED APPLICATIONS

The present application claims priority to Japanese Application Number 2019-072307, filed Apr. 4, 2019, the disclosure of which is hereby incorporated by reference herein in its entirety.

BACKGROUND OF THE INVENTION

1. Field of the Invention

The present invention relates to a jig supporting a reduction gear of a robot and a method of replacing a reduction gear by using a jig.

2. Description of the Related Art

A jig is known that supports a reduction gear provided in a robot to replace the reduction gear (e.g., JP 2013-78815 A). There is a demand for further improving efficiency of a work of replacing the reduction gear of the robot.

SUMMARY OF THE INVENTION

In an aspect of the present disclosure, a jig is configured to support a reduction gear when a second element of a robot is separated from a first element of the robot, wherein the reduction gear is configured to connect the first element and the second element each other so as to perform a speed-reduction operation, wherein the jig comprises a fixed portion detachably attached to the first element or the second element, a movable portion attached to the fixed portion so as to be rotationally or linearly movable, and a support attached to the movable portion and configured to suspend the reduction gear in a gravity direction to support the reduction gear.

In another aspect of the present disclosure, a method of replacing a reduction gear using the above-described jig includes fixing the support to the reduction gear mounted to one of the first element and the second element separated from each other, removing the reduction gear from the one of the first element and the second element and suspending the reduction gear in the gravity direction by the support to support the reduction gear, and moving the reduction gear supported by the support away from the one of the first element and the second element by moving the movable portion with respect to the fixed portion.

According to the present disclosure, an operator can move the reduction gear suspended from the support closer to and away from an attachment portion in the robot, by moving the movable portion. Due to this, it is not necessary to move the reduction gear by a heavy machine, whereby it is possible to improve efficiency of a work of replacing the reduction gear.

DETAILED DESCRIPTION

Figure 1:
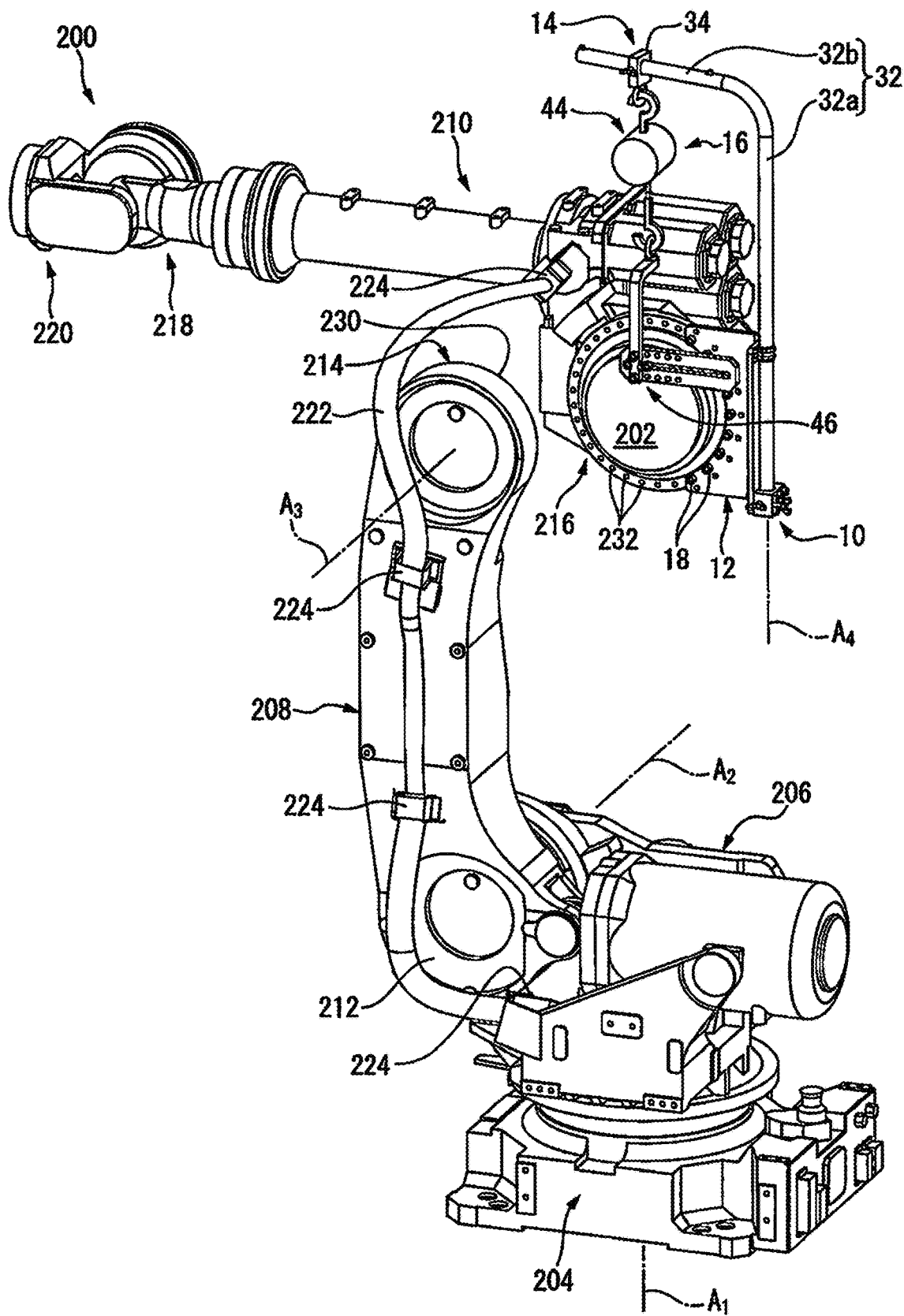
FIG. 1 is a perspective view of a jig and a robot including a reduction gear according to an embodiment.

Embodiments of the present disclosure will now be described in detail with reference to the drawings. Note that, in the various embodiments described below, similar elements are denoted by the same reference numerals, and redundant description thereof will be omitted. Further, in the following description, upward and downward directions may refer to the upward and downward directions in the gravity direction (i.e., the vertical direction).

First, with reference to FIG. 1 to FIG. 6, a jig 10 according to an embodiment will be described. The jig 10 is used for replacing a reduction gear 202 built in a robot 200. In the present embodiment, the robot 200 is a vertical articulated robot, and includes a base 204, a rotary barrel 206, a lower arm 208, an upper arm 210, and a wrist 220. The base 204 is fixed on a floor of a Work cell. The rotary barrel 206 is provided at the base 204 to as to be rotatable about an axis $A_1$. The axis $A_1$ is parallel to a vertical direction, for example.

The lower arm 208 includes a proximal end part 212 and a distal end part 214 opposite the proximal end part 212, wherein the proximal end part 212 is connected to the rotary barrel 206 so as to be rotatable about an axis $A_2$. The axis $A_2$ is orthogonal to the axis $A_1$. The upper arm 210 includes a proximal end part 216 and a distal end part 218 opposite the proximal end part 216, wherein the proximal end part 216 is connected to the distal end part 214 of the lower arm 208 so as to be rotatable about an axis $A_3$. The axis $A_3$ is parallel to the axis $A_2$.

The wrist 220 is rotatably provided at the distal end part 218 of the upper arm 210, and an end effector (welding torch, robot hand, paint applicator, etc., not illustrated) configured to perform a work (welding, handling, painting, etc.) on a workpiece is detachably attached to a distal end part of the wrist. The wrist 220 rotatably supports the end effector.

A servomotor (not illustrated) and a reduction gear (e.g., the reduction gear 202) are built in each constituent element (i.e., the base 204, rotary barrel 206, lower arm 208, upper arm 210, wrist 220) of the robot 200. The reduction gear connects a first constituent element and a second constituent element of the constituent elements of the robot 200, each other, so as to perform a speed-reduction operation therebetween. The servomotor rotates the first and second elements relative to each other via the reduction gear.

A cable 222 is wired on the robot 200. Specifically, the cable 222 is led out from the rotary barrel 206, and a connector (not illustrated) provided at a distal end of the cable 222 is connected to a connector (not illustrated) provided in the proximal end part 216 of the upper arm 210. The cable 222 includes e.g. a signal line transmitting a signal to a servomotor for driving the wrist 220 or the end effector attached to the wrist 220. The cable 222 is restrained by fittings 224 provided at the vicinity of each joint.

The reduction gear 202 connects the lower arm 208 and the upper arm 210 each other so as to perform a speed-reduction operation therebetween. Specifically, the reduction gear 202 is interposed between the distal end part 214 of the lower arm 208 and the proximal end part 216 of the upper arm 210, wherein an input side of the reduction gear 202 is mounted to the distal end part 214 of the lower arm 208 by a fastener (not illustrated) such as a bolt, while an output side of the reduction gear 202 is mounted to the proximal end part 216 of the upper arm 210 with a fastener (not illustrated) such as a bolt.

In a state in which the lower arm 208 and the upper arm 210 are connected to each other via the reduction gear 202, the reduction gear 202 is received in a hole 228 (FIG. 3) formed at the proximal end part 216 of the upper arm 210, and in a hole 230 (FIG. 1 and FIG. 3) formed at the distal end part 214 of the lower arm 208. The holes 228 and 230 are circular holes, and disposed to be concentric with each other with respect to the axis $A_3$ when the lower arm 208 and the upper arm 210 are connected.

The jig 10 suspends the reduction gear 202 therefrom to support it, and facilitates a replacement of the reduction gear 202 by moving the reduction gear 202 being suspended. The jig 10 includes a fixed portion 12, a movable portion 14, and a support 16. The fixed portion 12 is detachably attached to the upper arm 210. More specifically, the fixed portion 12 is attached to the proximal end part 216 of the upper arm 210 by a plurality of fasteners (e.g., bolts) 18.

Figure 4:
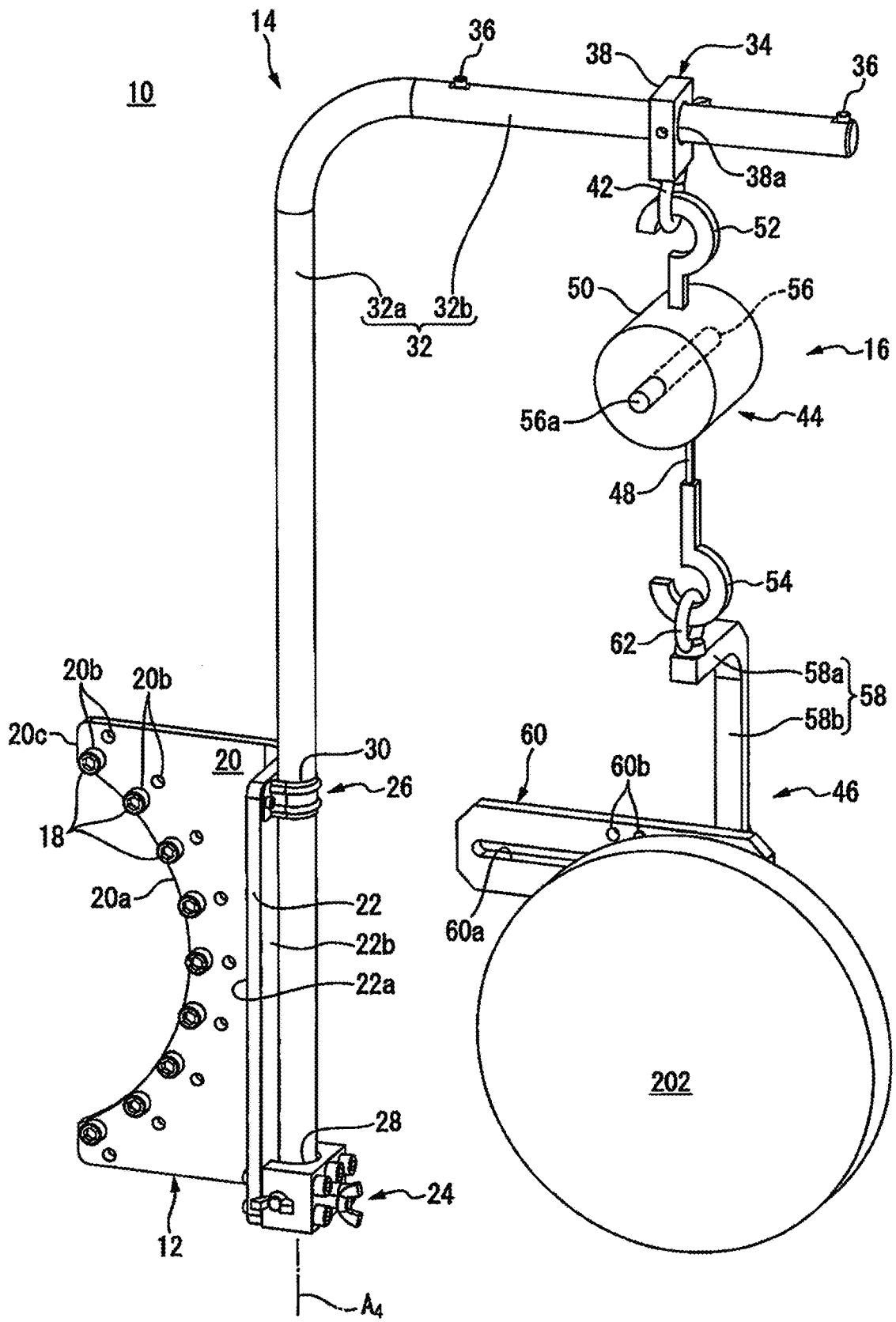
FIG. 4 is an enlarged view of the jig and the reduction gear illustrated in FIG. 2.

As illustrated in FIG. 4, the fixed portion 12 includes a flat-plate shaped first part 20 and a flat-plate shaped second part 22 extending substantially orthogonally to the first part 20. A circular recess 20a and a plurality of through holes 20b are formed in the first part 20. The recess 20a is formed to be recessed inward from an end face 20c of the first part 20, and has a radius substantially the same as the hole 228 formed in the proximal end part 216 of the upper arm 210.

The through holes 20b are disposed along a wall surface 20a defining the recess 20a. In the present embodiment, the through holes 20b are disposed so as to align along the wall surface 20a in two rows having an inner-row closer to the wall surface 20a and an outer-row farther away from the wall surface 20a than the inner row.

The second part 22 includes an inner surface 22a that faces toward the first part 20 and an outer surface 22b opposite the inner surface 22a, wherein fittings 24 and 26 are fixed to the outer surface 22b. The fitting 24 defines a bottomed hole 28 when fixed to the outer surface 22b. The fitting 26 defines a through hole 30 aligned with the hole 28 in a direction of an axis $A_4$ when fixed to the outer surface 22b.

In the present embodiment, the plurality of fasteners 18 are inserted into the through holes 20b of the inner-row formed in the first part 20 and fastened to fastening holes (specifically, tap holes) 232 formed in the proximal end part 216 of the upper arm 210, whereby the fixed portion 12 is detachably fixed to the proximal end part 216 of the upper arm 210.

Note that the fixed portion 12 is configured to be attached to and detached from the proximal end part 216 of the upper arm 210 in a state in which the lower arm 208 and the upper arm 210 are connected to each other. Thus, the first part 20 of the fixed portion 12 is configured to be inserted into a gap formed between the distal end part 214 of the lower arm 208 and the proximal end part 216 of the upper arm 210 when the lower arm 208 and the upper arm 210 are connected to each other (in other words, the first part 20 has a smaller thickness than the gap).

The fastening holes 232 are used to fasten a stopper (not illustrated) for restricting rotation of the upper arm 210 with respect to the lower arm 208, and formed in the proximal end part 216 so as to align around the hole 228 (or around the axis $A_3$) at substantially equal intervals. The through holes 20b of the inner-row and the outer-row in the first part 20 are disposed to align at the same intervals as the fastening holes 232.

As described above, in the present embodiment, the fixed portion 12 is fixed to the upper arm 210 by making use of the fastening holes 232 formed at the robot 200 for a predetermined application (e.g., for fastening the stopper). Note that, if the jig 10 is mounted to a robot of a type different from the robot 200, the jig 10 can be mounted to the different type of robot by using the through holes 20b of the outer-row in the first part 20 for fastening the fasteners 18. By selecting the inner-row and the outer-row of the through holes 20b in this way, it is possible to apply the jig 10 to different types of robots.

The movable portion 14 is attached to the fixed portion 12 so as to be rotationally and linearly movable. Specifically, the movable portion 14 includes a rotating member 32 and a linear-motion member 34. The rotating member 32 is a substantially L-shaped rod member having a circular cross section, and is attached to the fixed portion 12 so as to be rotatable about the axis $A_4$. The axis $A_4$ is substantially orthogonal to the rotational axis $A_3$ of the upper arm 210.

The rotating member 32 includes a first arm 32a extending linearly along the axis $A_4$ and a second arm 32b extending linearly in a direction orthogonal to the axis $A_4$. The first arm 32a is rotatably received in the hole 28 in the fitting 24 and the through hole 30 in the fitting 26, and attached to the fixed portion 12 via the fittings 24 and 26 so as to be rotatable. A pair of stoppers 36 are provided at the second arm 32b. These stoppers 36 are spaced apart from each other and protrude outward from the second arm 32b.

Figure 5:
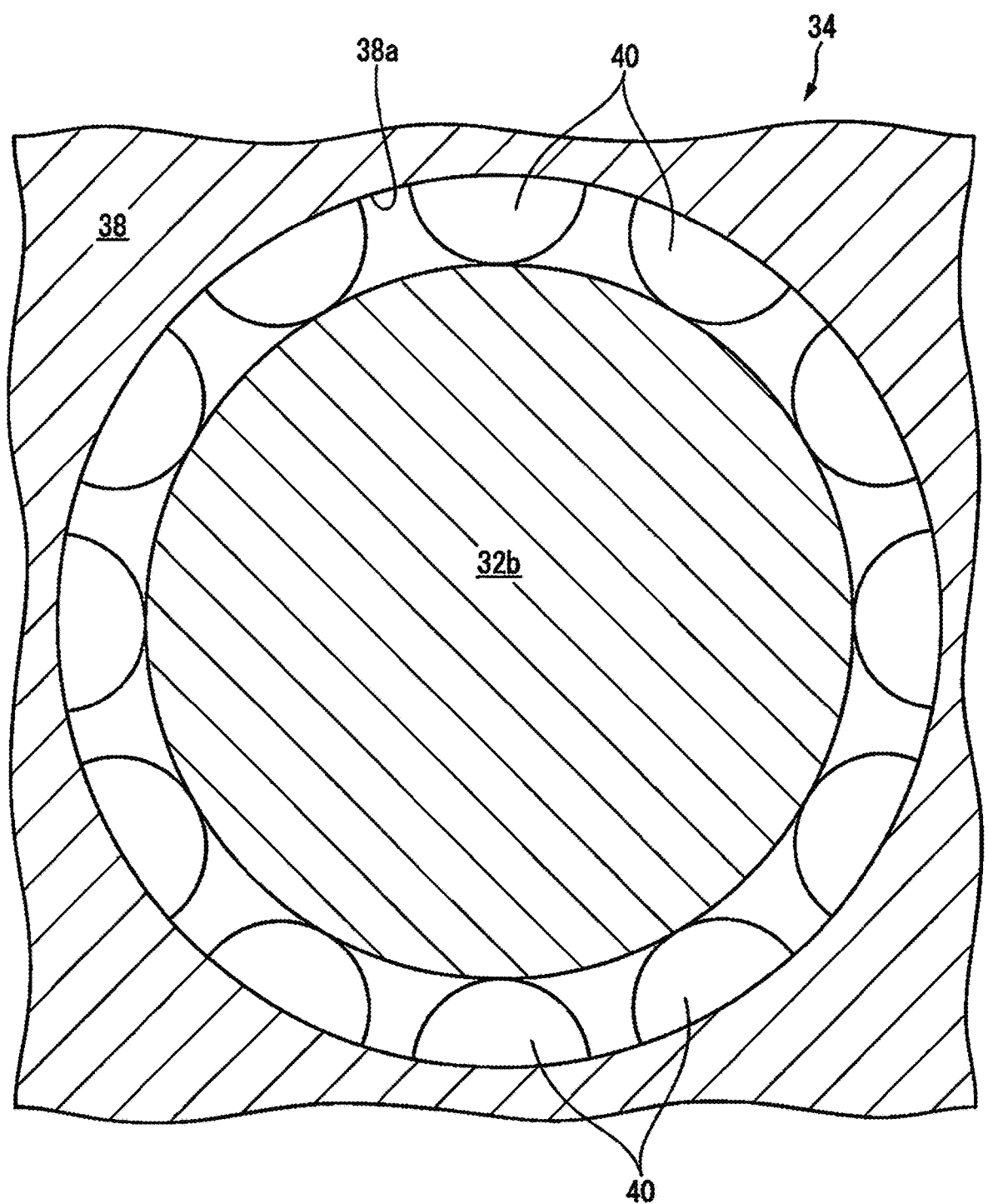
FIG. 5 is a cross-sectional view of a linear-motion member illustrated in FIG. 4.

The linear-motion member 34 is provided on the second arm 32b so as to be linearly movable. Specifically, as illustrated in FIG. 4 and FIG. 5, the linear-motion member 34 includes a main body 38, rolling elements 40 rotatably provided inside the main body 38, and a suspension tool 42 fixed to a lower side of the main body 38. The main body 38 is a hollow member having a cylindrical inner circumferential surface 38a.

The rolling elements 40 are e.g. balls (or rollers), and rotatably provided at the inner circumferential surface 38a of the main body 38 so as to protrude inward from the inner circumferential surface 38a. The second arm 32b is inserted into the main body 38 so as to contact each rolling element 40, whereby the linear-motion member 34 can be linearly moved along the second arm 32b.

Movement of the linear-motion member 34 with respect to the second arm 32b is restricted by the pair of stoppers 36 provided at the second arm 32b. The stoppers 36 prevent the linear-motion member 34 from moving to the first arm 32a or dropping off from a distal end of the second arm 32b. The suspension tool 42 is so-called an eye bolt or the like, and provided so as to protrude downward from the lower side of the main body 38.

The support 16 is attached to the movable portion 14, and suspends the reduction gear 202 therefrom in the gravity direction to support it. Specifically, the support 16 includes a suspending device 44 and a mounting member 46. The suspending device 44 is a device such as so-called a chain block, and includes a suspending wire 48, a housing section 50, and hooks 52 and 54. The suspending wire 48 is a high tensile wire member that can withstand the gravitational force of the reduction gear 202, such as a metal chain or a high tensile rope.

The housing section 50 is hollow, and the suspending wire 48 is wound up to be housed in the housing section 50. Specifically, a winding core 56 is rotatably provided in the housing section 50, and the suspending wire 48 is wound around the winding core 56. At one end of the winding core 56, a handle 56a protruding outward of the housing section 50 is provided, and the operator can rotate the winding core 56 by gripping and rotating the handle 56a.

Figure 6:
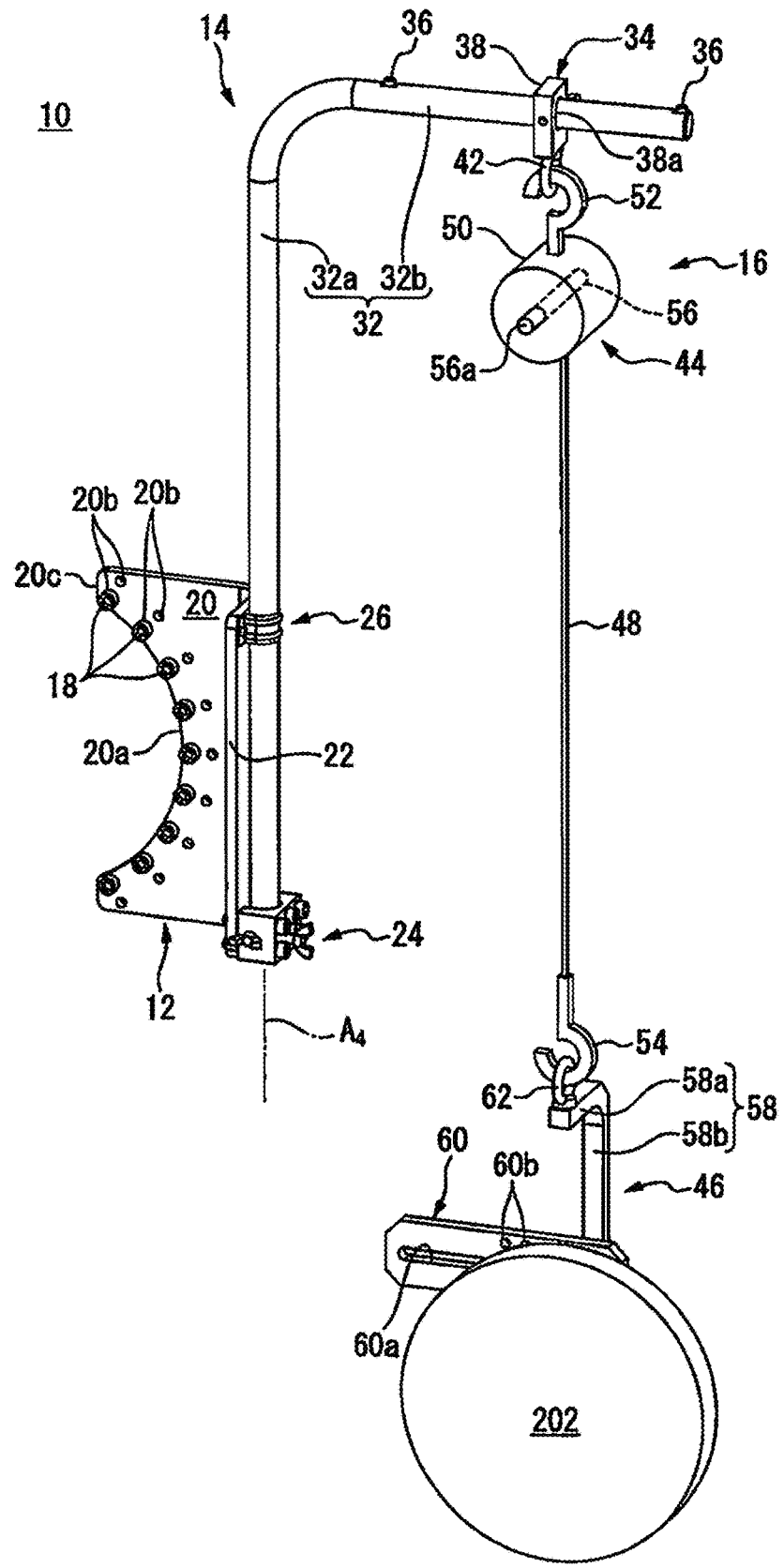
FIG. 6 illustrates a state in which a suspending device illustrated in FIG. 4 is used to move the reduction gear downward in the gravity direction from a position illustrated in FIG. 4.

If the operator rotates the handle 56a in one direction from the state illustrated in FIG. 4, the suspending wire 48, which has been wound up around the winding core 56, is pulled out from the housing section 50 so as to downwardly move the hook 54 suspended from a distal end of the suspending wire 48, as illustrated in FIG. 6. On the other hand, if the operator rotates the handle 56a in the other direction from the state illustrated in FIG. 6, the suspending wire 48 is wound around the winding core 56 to move the hook 54 upward.

The hook 52 is fixedly provided on an outer circumferential surface of the housing section 50. The hook 52 is a substantially C-shaped member formed of e.g. a metal, and suspended from the suspension tool 42. On the other hand, the hook 54 is fixedly provided at the distal end of the suspending wire 48. Similar to the hook 52, the hook 54 is a substantially C-shaped member formed of e.g. a metal.

The mounting member 46 includes a first member 58, a second member 60, and a suspension tool 62. The first member 58 has a substantial L shape, and includes a first arm 58a and a second arm 58b that is substantially orthogonal to the first arm 58a. The second arm 58b extends downward from one end of the first arm 58a. The suspension tool 62 is fixedly provided on a top face of the other end of the first arm 58a. The suspension tool 62 is a so-called eye bolt, and provided so as to protrude upward from the other end of the first arm 58a. The suspension tool 62 is suspended from the hook 54.

Figure 2:
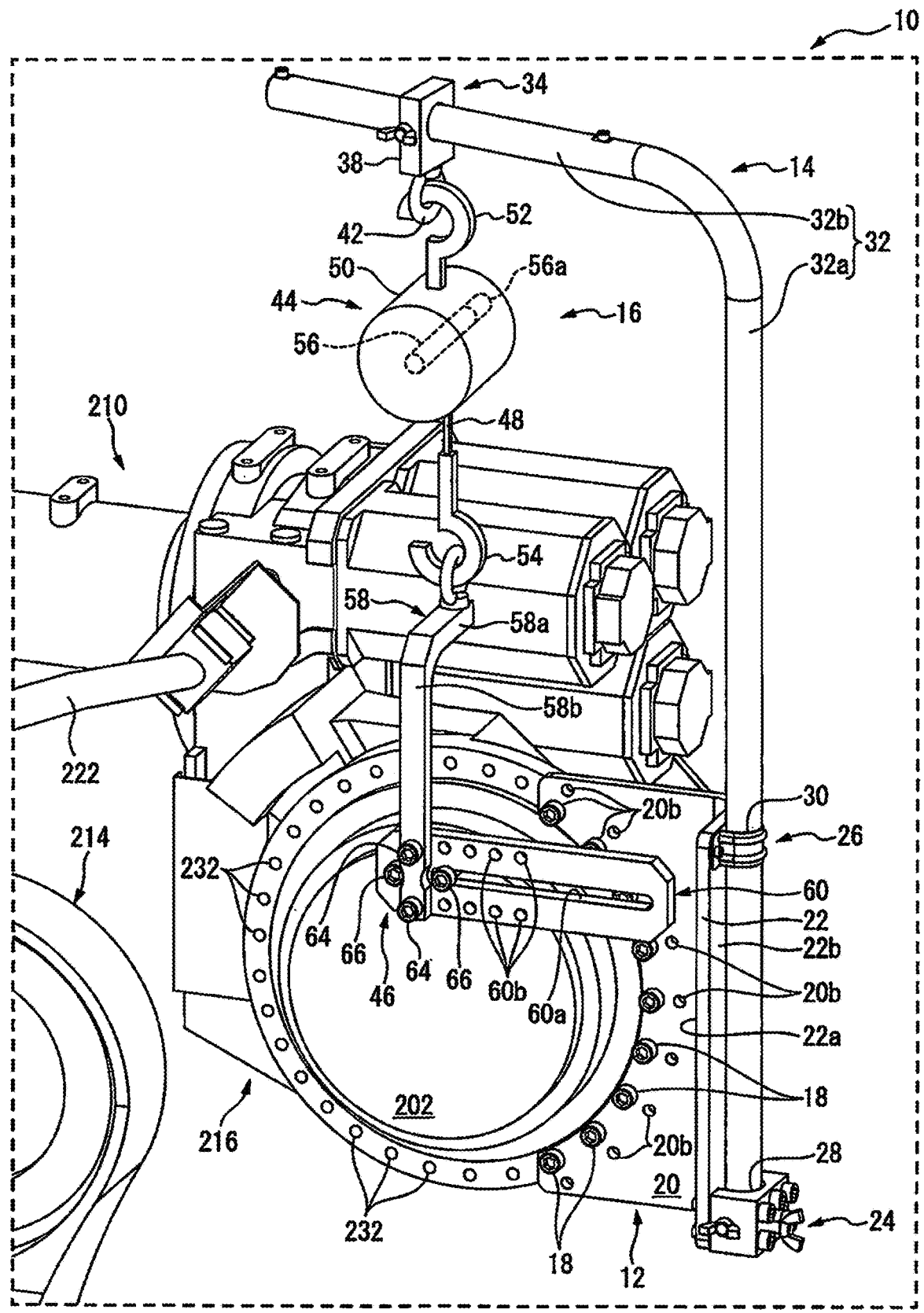
FIG. 2 is an enlarged view of a main portion of FIG. 1.

As illustrated in FIG. 2 and FIG. 4, the second member 60 is a substantially rectangular flat plate member elongating in a lateral direction. A slot 60a and a plurality of fastening holes (such as tap holes) 60b are formed in the second member 60. The slot 60a is elongated in the lateral direction. The fastening holes 60b are divided into two rows on an upper side and a lower side of the slot 60a, and disposed to align along the slot 60a.

The second arm 58b of the first member 58 is fixed to the second member 60 by a pair of fasteners (such as bolts) 64. The pair of fasteners 64 is inserted into a pair of through holes (not illustrated) formed in the second arm 58b, and one of the pair of fasteners 64 is fastened to the fastening hole 60b disposed on the upper side of the slot 60a, while the other one of the pair of fasteners 64 is fastened to the fastening hole 60b disposed on the lower side of the slot 60a. In this way, the first member 58 and the second member 60 are firmly fixed to each other. Note that, by changing the pair of fastening holes 60b to be fastened by the fasteners 64, it is possible to adjust the position of the second member 60 with respect to the first member 58 in the lateral direction.

The mounting member 46 is detachably attached to the reduction gear 202. Specifically, as illustrated in FIG. 2, a pair of fasteners (such as bolts) 66 are disposed on both the right and left sides of the second arm 58b, and right-side one of the pair of fasteners 66 is inserted into the slot 60a, while the left-side one of the pair of fastener 66 is inserted into a through hole (not illustrated) formed in the second member 60 so as to be separate leftward from the slot 60a. Then, the pair of fasteners 66 are fastened, at their distal ends, to a pair of fastening holes (not illustrated) formed in the reduction gear 202.

Figure 3:
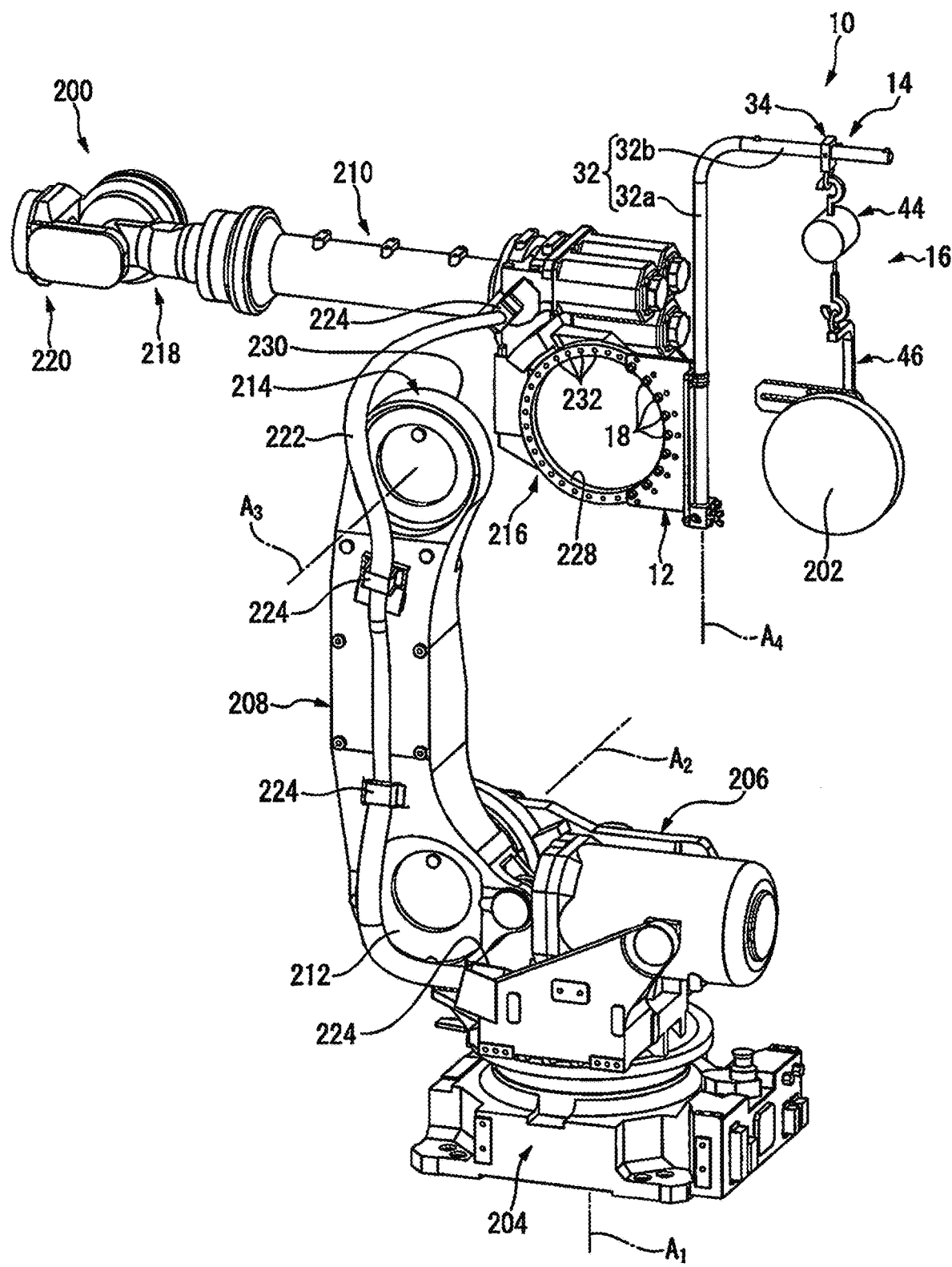
FIG. 3 illustrates a state in which the jig illustrated in FIG. 1 is used to support the reduction gear and to move the reduction gear from a position illustrated in FIG. 1.

In this way, the mounting member 46 is firmly fixed to the reduction gear 202, and the support 16 can suspend the reduction gear 202 in the gravity direction to support the reduction gear 202 when the reduction gear 202 is separated away from the upper arm 210 as illustrated in FIG. 3 and FIG. 4. Note that, since the distance between the pair of fasteners 66 can be adjusted due to the slot 60a, and the mounting member 46 can be mounted to reduction gears having various diameters and including fastening holes with various pitches.

Next, a method of replacing the reduction gear 202 of the robot 200 using the jig 10 will be described. First, in a state in which the lower arm 208 and the upper arm 210 connected to each other, the operator fixes the fixed portion 12 of the jig 10 to the proximal end part 216 of the upper arm 210 by the fasteners 18. Then, the operator removes the fasteners, which have fastened the lower arm 208 and the reduction gear 202 together, while suspending the upper arm 210 by a heavy machine (not illustrated) such as a crane, and separates the lower arm 208 away from the reduction gear 202.

As a result, as illustrated in FIG. 1, the upper arm 210 and the reduction gear 202 fixed to the proximal end part 216 of the upper arm 210 are separated from the lower arm 208 and suspended by the heavy machine. At this time, the heavy machine may suspend the upper arm 210 such that the axis $A_4$ of the jig 10 is substantially parallel with the vertical direction.

In this regard, the operator carries out a work of separating the upper arm 210 from the lower arm 208 in a state in which the cable 222 is connected to a connector provided at the proximal end part 216. Accordingly, the upper arm 210 separated from the lower arm 208 is suspended by the heavy machine at a position away from the lower arm 208 to the extent that the cable 222 can be kept connected to the connector.

Then, the operator fixes the mounting member 46 of the support 16 to the reduction gear 202 fixed to the upper arm 210 by the fasteners 66. The operator then removes the fasteners, which have fastened the upper arm 210 and the reduction gear 202 together, so as to separate the reduction gear 202 away from the upper arm 210. Thus, the reduction gear 202 is suspended in the gravity direction and supported by the support 16.

Here, when the reduction gear 202 is suspended from the support 16, the center of gravity of the reduction gear 202 and the suspension tool 62 of the mounting member 46 are aligned in the gravity direction. In order to achieve such alignment between the center of gravity of the reduction gear 202 and the suspension tool 62, the first member 58 is configured to have a substantial L shape.

According to this configuration, when the reduction gear 202 is suspended from the support 16, the reduction gear 202 can be prevented from inclining with respect to the gravity direction and supported in a stable orientation. Note that, by changing the fastening holes 60b to be fastened by the fasteners 64 to adjust the position of the second member 60 with respect to the first member 58 in the lateral direction, it is possible to more effectively prevent the reduction gear 202 from being inclined with respect to the gravity direction.

Then, the operator moves the reduction gear 202 supported by the support 16 away from the upper arm 210 by moving the movable portion 14 with respect to the fixed portion 12. Specifically, the operator rotates the rotating member 32 of the movable portion 14 about the axis $A_4$ from the position illustrated in FIG. 1 and FIG. 2 to the position illustrated in FIG. 3 and FIG. 4.

Due to this, the support 16 and the reduction gear 202 supported by the support 16 are moved away from the upper arm 210 in the horizontal direction. In this manner, the rotating member 32 of the movable portion 14 rotates with respect to the fixed portion 12 to move the support 16 and the reduction gear in the horizontal direction. Note that FIG. 3 and FIG. 4 illustrate an example in which the rotating member 32 is rotated approximately 180° from the position illustrated in FIG. 1 and FIG. 2.

Here, by linearly moving the linear-motion member 34 along the second arm 32b as necessary, the operator can move the reduction gear 202 along the second arm 32b in the horizontal direction. Specifically, the operator applies a force to the reduction gear 202 or support 16 in the horizontal direction, for example. Due to this, the linear-motion member 34 of the movable portion 14 linearly moves along the second arm 32b, whereby the reduction gear 202 is moved in the horizontal direction together with the support 16.

As described above, the linear-motion member 34 can linearly move with respect to the fixed portion 12 to move the support 16 and the reduction gear 202 in the horizontal direction. According to this configuration, the operator can adjust the position of the reduction gear 202 in the horizontal direction as necessary in a case where the operator desires to further move the reduction gear 202 away from (or toward) the fixed portion 12 after the rotation of the rotating member 32.

After rotating the rotating member 32, the operator rotates the handle 56a of the suspending device 44 in one direction from the state illustrated in FIG. 4 so as to draw the suspending wire 48 out of the housing section 50. As a result, it is possible to downwardly move the mounting member 46 and the reduction gear 202 that are suspended from the distal end of the suspending wire 48 via the hook 54, as illustrated in FIG. 6. As an example, the operator operates the suspending device 44 so as to move the reduction gear 202 downward until it is placed on the floor of the work cell.

The operator then removes the fastener 66 fixing the mounting member 46 and the reduction gear 202, and removes the mounting member 46 from the reduction gear 202. The operator then fixes a new reduction gear 202 to the mounting member 46 by the fastener 66. The operator then rotates the handle 56a of the suspending device 44 in the other direction.

By this operation, the suspending wire 48 is wound around the winding core 56, whereby the mounting member 46 and the new reduction gear 202 is moved upward from the position illustrated in FIG. 6 to the position illustrated in FIG. 4. Thus, the suspending device 44 can move the mounting member 46 and the reduction gear 202 so as to be reciprocated along the gravity direction. In this way, the new reduction gear 202 is suspended from the support 16 in the gravity direction and supported by the support 16.

Then, the operator moves the new reduction gear 202 supported by the support 16 toward the upper arm 210 by moving the movable portion 14 with respect to the fixed portion 12. Specifically, the operator rotates the rotating member 32 of the movable portion 14 from the position illustrated in FIG. 3 and FIG. 4 to the position illustrated in FIG. 1 and FIG. 2.

As a result, the new reduction gear 202 can be disposed at the proximal end part 216 of the upper arm 210, which is an attachment portion to which the reduction gear 202 is to be attached. At this time, the operator may move the new reduction gear 202 in the horizontal direction along the second arm 32b via the linear-motion member 34 so as to adjust the position of the new reduction gear 202, as necessary, in order to position the new reduction gear 202 at the proximal end part 216 of the upper arm 210.

The operator then fixes the output side of the new reduction gear 202 to the proximal end part 216 of the upper arm 210 by the fasteners, and subsequently, fixes the input side of the new reduction gear 202 to the distal end part 214 of the lower arm 208. In this way, the operator can replace the reduction gear 202 using the jig 10.

As described above, according to the present embodiment, by moving the movable portion 14, the operator can move the reduction gear 202 suspended from the support 16 closer to and away from the attachment portion (in this embodiment, the proximal end part 216) in the robot 200 to which the reduction gear is to be attached. According to this configuration, it is not necessary to move the reduction gear 202 by the heavy machine, the work of replacing the reduction gear 202 can be made more efficient.

Further, according to the present embodiment, it is possible to move the reduction gear 202 while being stably suspended and supported by the support 16. Thus, the operator can more safely replace the reduction gear 202 which is a heavy load of a relatively high weight.

Further, the fixed portion 12 can be attached to and detached from the constituent element of the robot 200 (in the present embodiment, the upper arm 210). According to this configuration, the operator can fix the fixed portion 12 to the upper arm 210 by making use of the fastening holes 232 formed in the robot 200 for a predetermined application (e.g., for fastening the stopper). Thus, another jig for fixing the jig 10 is unnecessary, and the operator can easily and quickly attach and detach the fixed portion 12 to and from the constituent element of the robot 200.

Further, in the present embodiment, the fixed portion 12 is configured to be attachable to and detachable from the upper arm 210 while the lower arm 208 and the upper arm 210 connected to each other. According to this configuration, since the jig 10 can be mounted to the upper arm 210 before the upper arm 210 is suspended by the heavy machine, it is possible to improve the work-efficiency. Further, due to the recess 20a formed at the fixed portion 12, it is possible to prevent the fixed portion 12 from interfering with the reduction gear 202 or a component of the robot 200, when attaching the fixed portion 12 while the lower arm 208 and the upper arm 210 are connected to each other.

Further, in the present embodiment, the fixed portion 12 is fixed to the proximal end part 216, which is a part of the upper arm 210 close to the rotational axis $A_3$ (i.e., the reduction gear 202) of the upper arm 210 with respect to the lower arm 208. According to this configuration, since the jig 10 can be disposed close to the reduction gear 202, it is possible to miniaturize each component (the movable portion 14, the support 16) of the jig 10.

Further, in the present embodiment, the movable portion 14 rotates with respect to the fixed portion 12 by the action of the rotating member 32 to move the support 16 in the horizontal direction. According to this configuration, the operator can easily move the reduction gear 202 of a heavy load, with a relatively small force. Further, in the present embodiment, the movable portion 14 includes the linear-motion member 34 in addition to the rotating member 32, whereby rotating and linearly moving with respect to the fixed portion 12 to move the support 16 in the horizontal direction. According to this configuration, the operator can adjust the position of the reduction gear 202 more finely, by moving the reduction gear 202 suspended from the support 16 in a plurality of directions.

Further, in the present embodiment, by operating the suspending device 44, the operator can reciprocatedly move the mounting member 46 along the gravity direction. According to this configuration, it is possible to expand a range within which the reduction gear 202 can be moved, and improve the efficiency of the replacement of the reduction gear 202.

Figure 7:
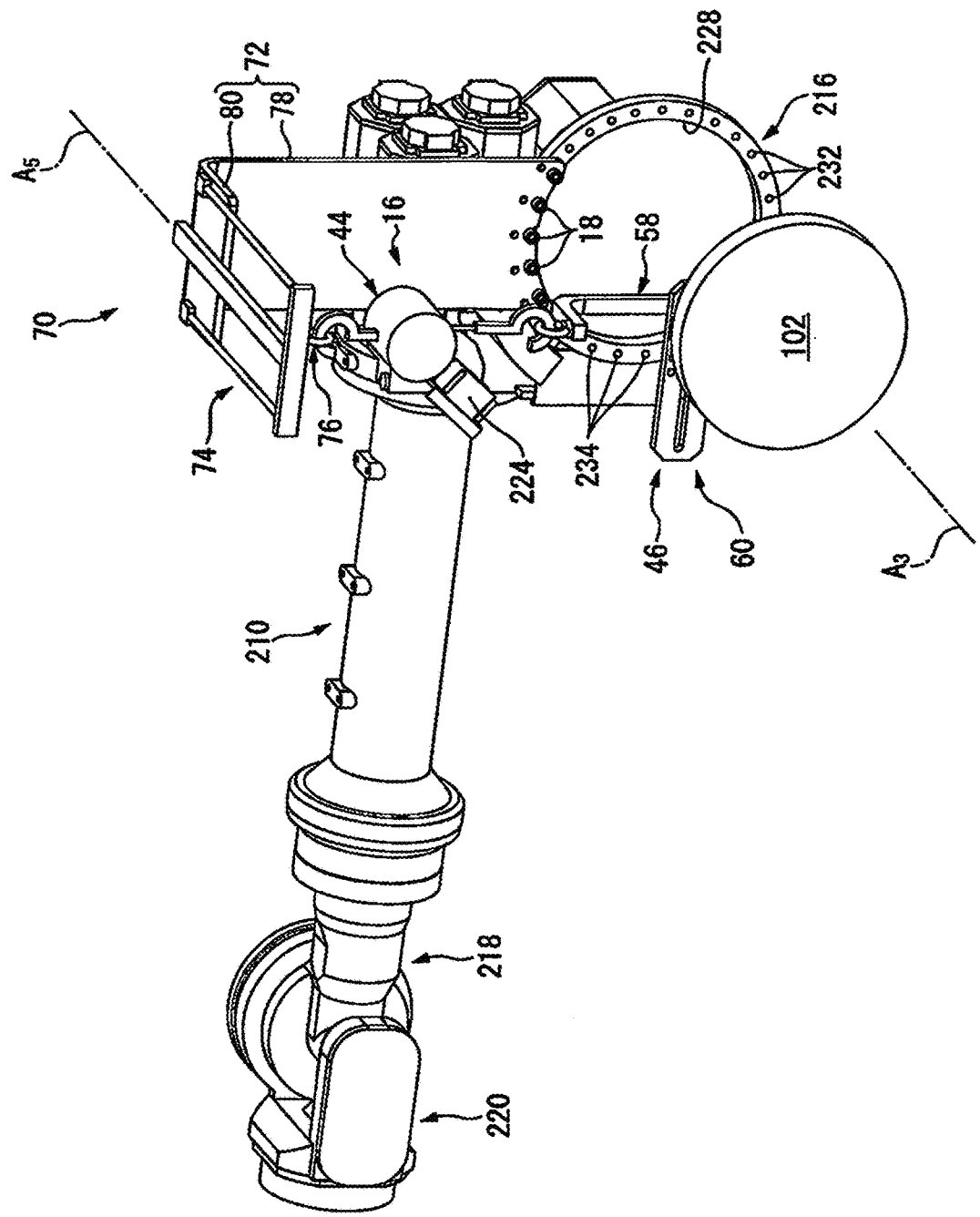
FIG. 7 illustrates a state in which a jig according to another embodiment is used to suspend the reduction gear in the gravity direction.

Next, a jig 70 according to another embodiment will be described with reference to FIG. 7 to FIG. 9. The jig 70 includes a fixed portion 72, a guide mechanism 74, a movable portion 76, and a support 16. The fixed portion 72 is detachably attached to the proximal end part 216 of the upper arm 210, using a plurality of fasteners 18.

Figure 8:
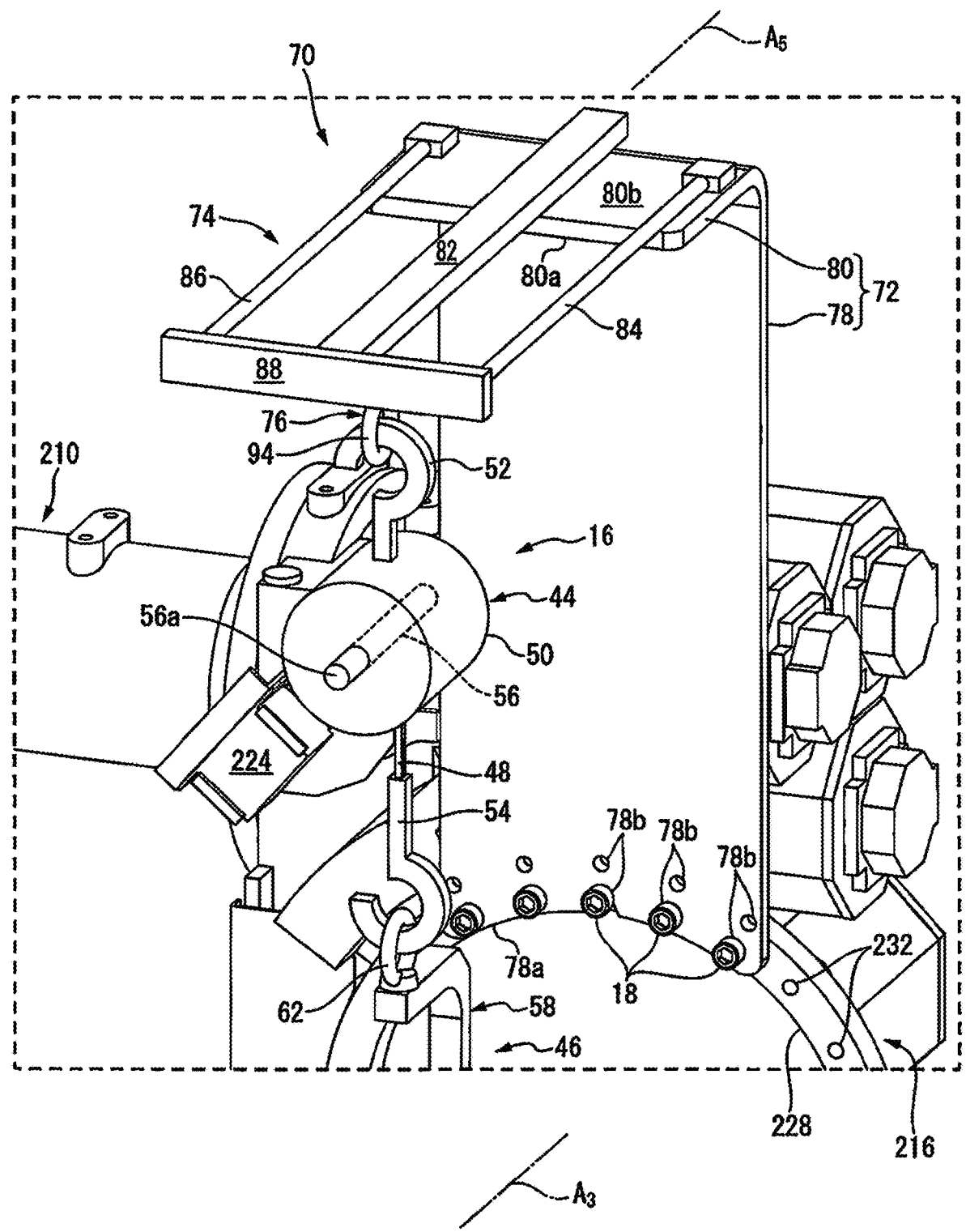
FIG. 8 is an enlarged view of a main portion of FIG. 7.

As illustrated in FIG. 8, the fixed portion 72 is a flat plate member bent in a substantial L shape, and includes a first part 78 and a second part 80 that is substantially orthogonal to the first part 78. The first part 78 is disposed to extend upward from the proximal end part 216, and formed with a circular recess 78a and a plurality of through holes 78b. The recess 78a is formed at a lower end of the first part 78, and has substantially the same radius as the hole 228 formed in the proximal end part 216 of the upper arm 210.

The through holes 78b are disposed along a wall surface 78a defining the recess 78a. In the present embodiment, the through holes 78b are disposed so as to align along the wall surface 78a in two rows having an inner-row closer to the wall surface 78a and an outer-row farther away from the wall surface 78a than the inner-row. The second part 80 includes an inner surface 80a facing toward the first part 78 and an outer surface 80b opposite the inner surface 80a.

In the present embodiment, the plurality of fasteners 18 are inserted into the through holes 78b of the inner-row formed in the first part 78, and fastened to the fastening holes 232 formed in the proximal end part 216 of the upper arm 210, whereby the fixed portion 72 is detachably fixed to the proximal end part 216 of the upper arm 210.

Similar to above-described the fixed portion 12, the fixed portion 72 is configured to be attached to and detached from the proximal end part 216 of the upper arm 210 while the lower arm 208 and the upper arm 210 are connected to each other. Accordingly, the first part 78. of the fixed portion 72 has a thickness smaller than a gap formed between the distal end part 214 of the lower arm 208 and the proximal end part 216 of the upper arm 210 when the lower arm 208 and the upper arm 210 are connected to each other, and thereby being insertable into the gap.

The guide mechanism 74 includes a rail 82, support arms 84 and 86, and an end plate 88. The rail 82 extends along an axis $A_5$, and a proximal end of the rail 82 is fixed to the outer surface 80b of the second part 80, while a distal end of the rail 82 is fixed to the end plate 88. The axis $A_5$ is substantially parallel to the rotational axis $A_3$ of the upper arm 210.

Figure 9:
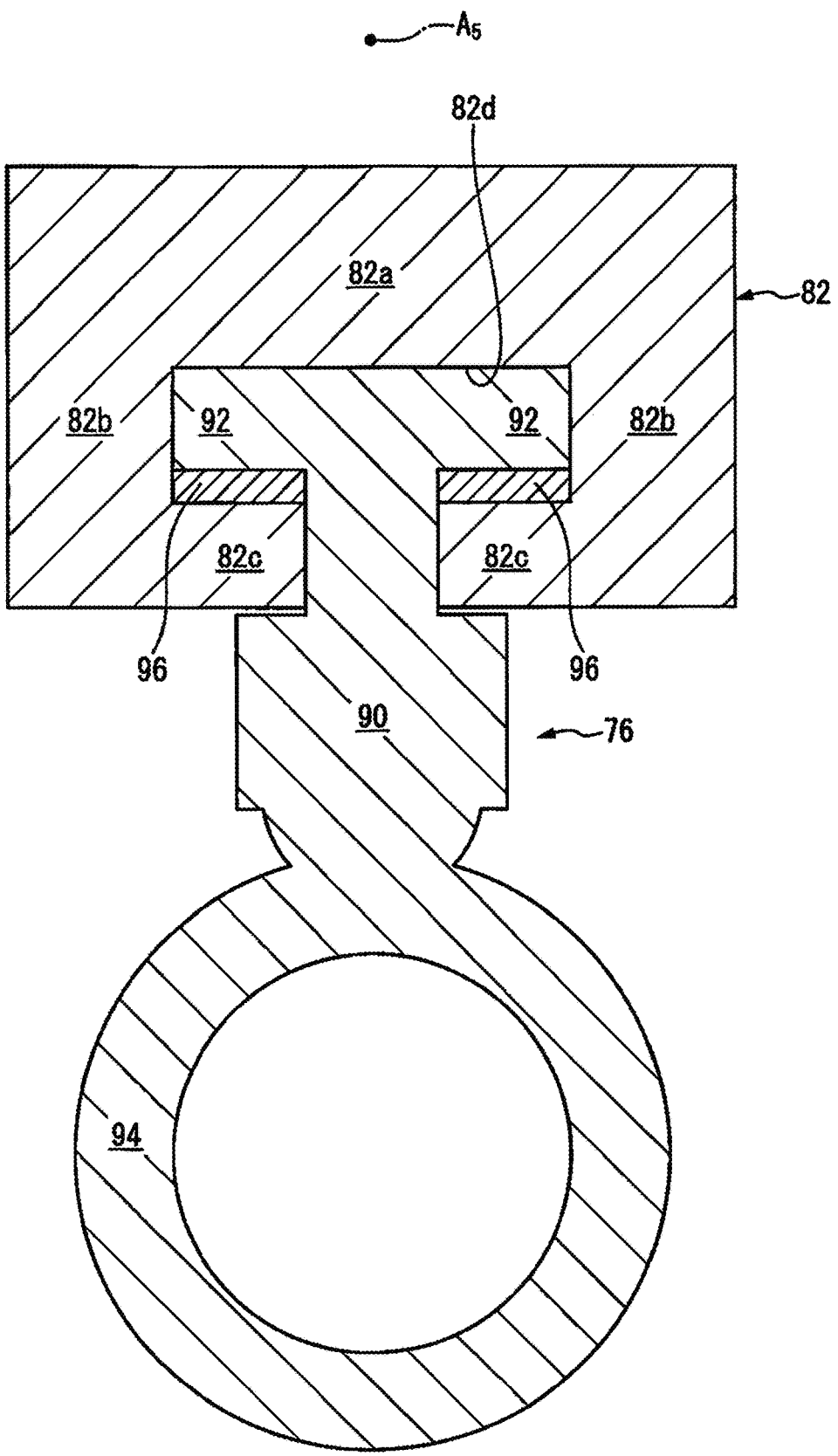
FIG. 9 is a cross-sectional view of a movable portion and a rail illustrated in FIG. 7.

As illustrated in FIG. 9, the rail 82 includes an upper wall 82a, a pair of side walls 82b extending downward from both side edges of the upper wall 82a so as to be opposite to each other, and a pair of collars 82c protruding from the pair of side walls 82b. The upper wall 82a, the side walls 82b, and the collars 82c define a recess 82d of a substantially T-shaped cross section inside the rail 82.

As illustrated in FIG. 8, the support arm 84 is disposed at one side of the rail 82 so as to be separate away from the rail 82, and a proximal end of the support arm 84 is fixed to the outer surface 80b of the second part 80, while a distal end of the support arm 84 is fixed to the end plate 88. On the other hand, the support arm 86 is disposed at the other side of the rail 82 so as to be separate away from the rail 82, and a proximal end of the support arm 86 is fixed to the outer surface 80b of the second part 80, while a distal end of the support arm 86 is fixed to the end plate 88. The support arms 84 and 86 extend linearly along the axis $A_5$. The end plate 88 extends in a direction orthogonal to the axis $A_5$, and integrally connects the rail 82 and the support arms 84 and 86 to each other.

The movable portion 76 is guided by the guide mechanism 74 to linearly move along the axis $A_5$ with respect to the fixed portion 72. Specifically, as illustrated in FIG. 9, the movable portion 76 includes a main body 90 extending in a vertical direction, a flange 92 protruding from an upper end of the main body 90 to both sides of the main body 90, and an annular suspension tool 94 provided at a lower end of the main body 90.

The flange 92 is housed in the recess 82d of the rail 82. A plurality of rollers 96 are interposed between the flange 92 and the collars 82c. The rollers 96 are each provided in the rail 82 so as to be rotatable about an axis orthogonal to the axis $A_5$, and disposed to align along the axis $A_5$.

The flange 92 engages the collars 82c via the rollers 96, by which the movable portion 76 is prevented from falling off from the rail 82, and the guide mechanism 74 smoothly guides a linear-movement of the movable portion 76 along the axis $A_5$. The suspension tool 94 is so-called an eye bolt. The main body 90, the flange 92, and the suspension tool 94 are integrally coupled to each other so as to form the movable portion 76 that is a single monolithic member.

The support 16 is attached to the movable portion 76. Specifically, as illustrated in FIG. 8, the hook 52 of the support 16 is suspended from the suspension tool 94 of the movable portion 76, whereby the support 16 is suspended from the movable portion 76. The movable portion 76 linearly moves with respect to the fixed portion 72 so as to move the support 16 and the reduction gear 202 supported by the support 16 in the horizontal direction.

By linearly moving the movable portion 76 of the jig 70, the operator can move the reduction gear 202 suspended from the support 16 closer to and away from the attachment portion (the proximal end 216) in the robot 200 where the reduction gear is to be attached. According to this configuration, similar as the above-described jig 10, since it is not necessary to move the reduction gear 202 by the heavy machine, the work of replacing the reduction gear 202 can be made more efficient.

Figure 10:
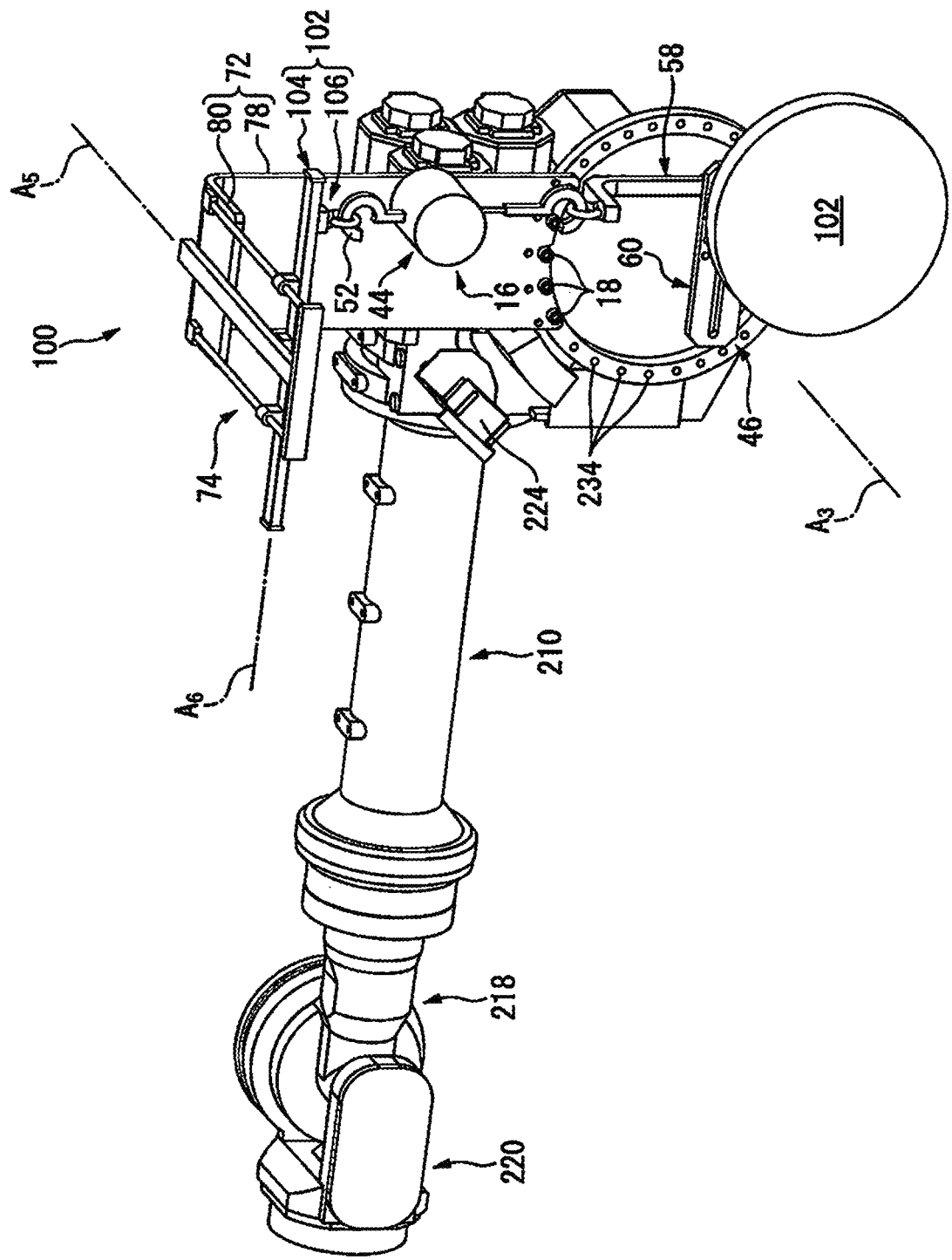
FIG. 10 illustrates a state in which a jig according to yet another embodiment is used to suspend the reduction gear in the gravity direction.
Figure 11:
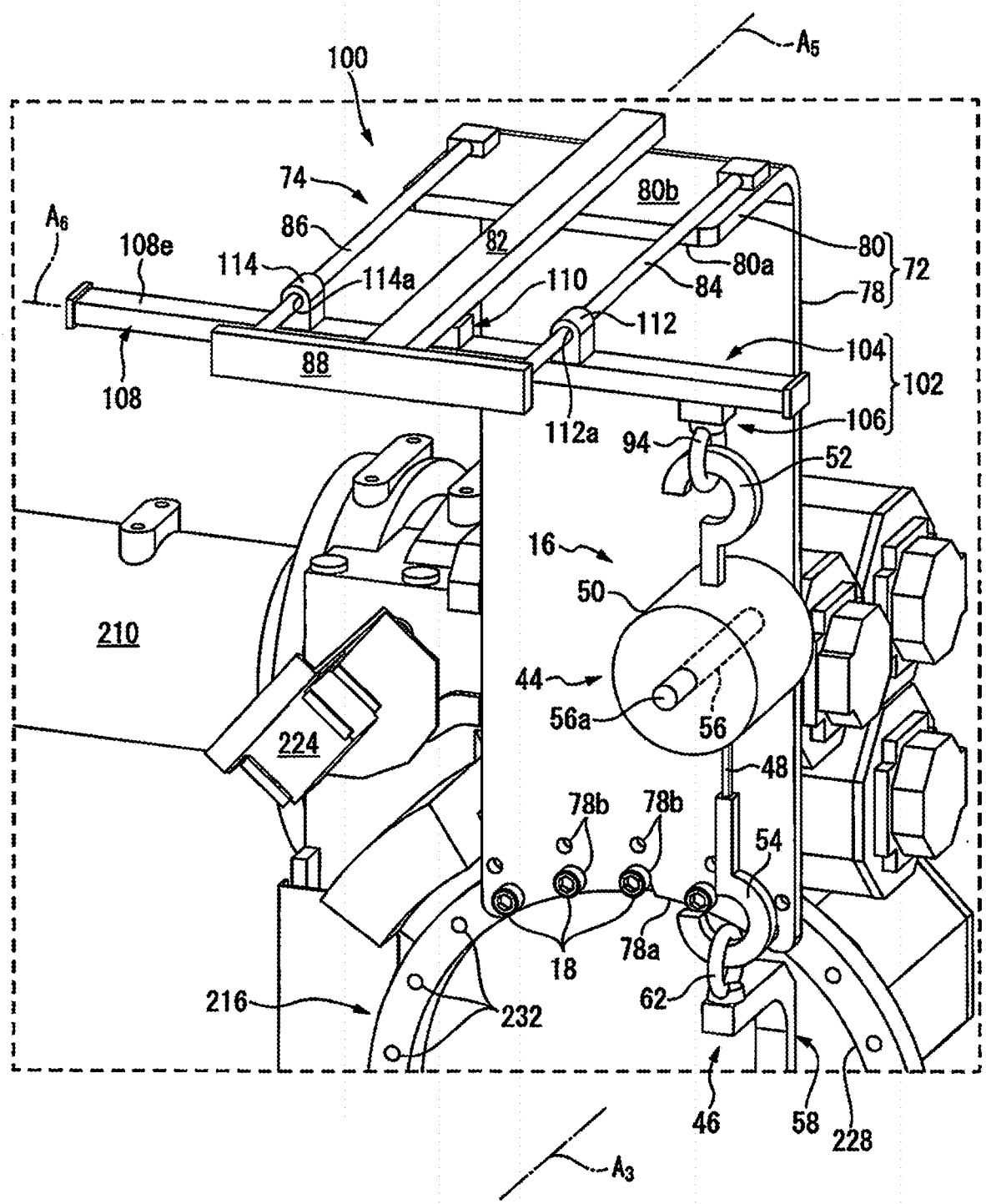
FIG. 11 is an enlarged view of a main portion of FIG. 10.

Next, a jig 100 according to still another embodiment will be described with reference to FIG. 10 to FIG. 13. The jig 100 differs from the above-described jig 70 in a movable portion 102. Specifically, as illustrated in FIG. 11, the movable portion 102 includes a first linear-motion member 104 and a second linear-motion member 106.

The first linear-motion member 104 is attached to the fixed portion 72 via the guide mechanism 74, and is guided by the guide mechanism 74 so as to linearly move along the axis $A_5$ with respect to the fixed portion 72. Specifically, the first linear-motion member 104 includes a rail 108, and engaging sections 110, 112 and 114 that are fixedly provided on a top face 108e of the rail 108 so as to protrude upward from the top face 108e.

Figure 13:
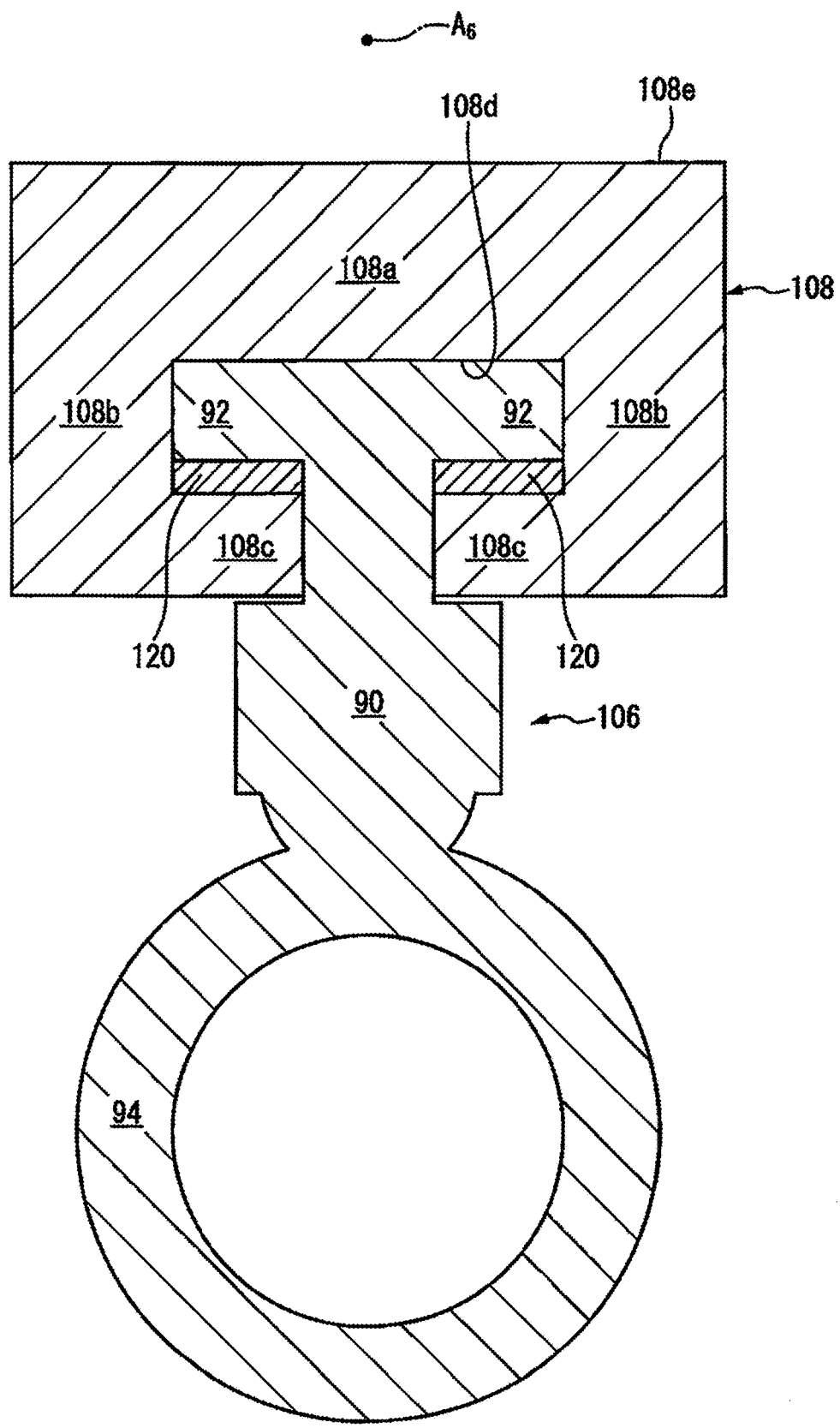
FIG. 13 illustrates a cross-sectional view of a second linear-motion member illustrated in FIG. 10 and the rail of the first linear-motion member.

The rail 108 extends along an axis $A_6$ orthogonal to the axis $A_5$. Specifically, as illustrated in FIG. 13, the rail 108 includes an upper wall 108a, a pair of side walls 108b extending downward from both side edges of the upper wall 108a so as to be opposite to each other, and a pair of collars 108c protruding from the pair of side walls 108b. The upper wall 108a, the side walls 108b, and the collars 108c define a recess 108d having a substantially T-shaped cross section inside the rail 108.

Figure 12:
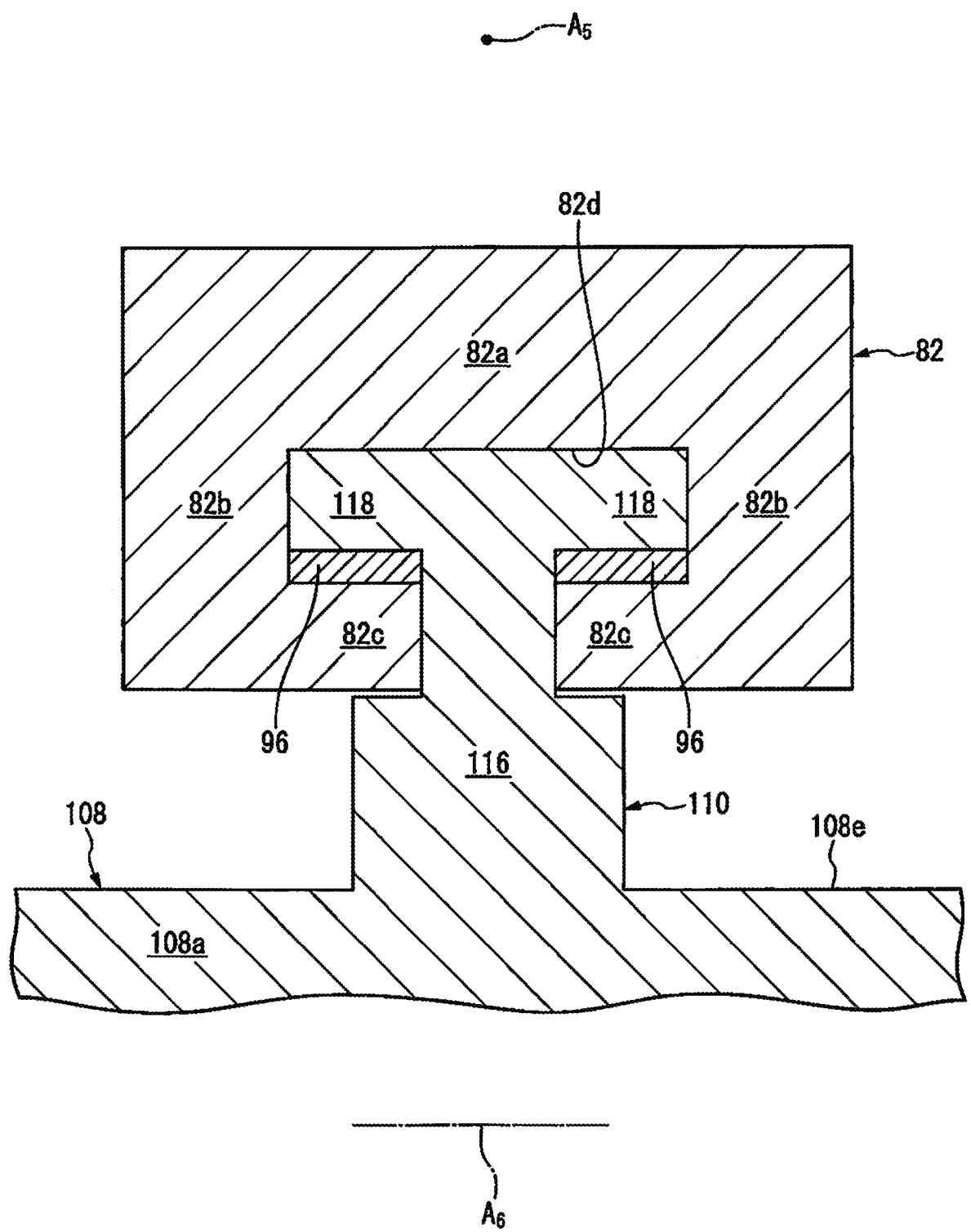
FIG. 12 illustrates a cross-sectional view of an engaging section of a first linear-motion member illustrated in FIG. 10 and a rail of a guide mechanism.

Referring again to FIG. 11, the engaging section 110 is disposed at a substantially center part of the top face 108e of the rail 108, and engages the rail 82 so as to be linearly movable. Specifically, as illustrated in FIG. 12, the engaging section 110 includes a main body 116 and a flange 118 protruding from an upper end of the main body 116 to both sides. The main body 116 extends upward from the top face 108e of the rail 108. The flange 118 is housed inside the recess 82d of the rail 82, and the rollers 96 are interposed between the flange 118 and the collars 82c of the rail 82.

As illustrated in FIG. 11, the engaging section 112 is disposed at one side of the engaging section 110 so as to be separate away from the engaging section 110, and includes a through hole 112a in which the support arm 84 is slidably received. On the other hand, the engaging section 114 is disposed at the other side of the engaging section 110 so as to be separate away from the engaging section 110, and includes a through hole 114a in which the support arm 86 is slidably received.

Note that rolling elements, a low-friction material, a lubricant, or the like may be provided inside the through holes 112a and 114a in order to allow smooth sliding motion relative to the support arms 84 and 86. In this way, the engaging sections 110, 112 and 114 respectively engage the rail 82, the support arms 84 and 86, whereby the first linear-motion member 104 is guided to linearly move along the axis $A_5$ without falling off from the guide mechanism 74.

The second linear-motion member 106 is movably attached to the first linear-motion member 104, and guided by the rail 108 of the first linear-motion member 104 so as to move along the axial line $A_6$ with respect to the fixed portion 72. Specifically, as illustrated in FIG. 13, the second linear-motion member 106 includes the main body 90, the flange 92, and the suspension tool 94 similar as the above-described movable portion 76. A plurality of rollers 120 are interposed between the flange 92 of the second linear-motion member 106 and the collars 108c of the rail 108.

The rollers 120 are each provided in the rail 108 so as to be rotatable about an axis orthogonal to an axis $A_6$ (i.e., parallel to the axis $A_5$), and disposed to align along the axis $A_6$. The flange 92 of the second linear-motion member 106 engages the collars 108c via the rollers 120, whereby the second linear-motion member 106 is guided by the rail 108 to linearly move along the axis $A_6$ while being prevented from falling off from the rail 108.

The support 16 is attached to the movable portion 102. Specifically, as illustrated in FIG. 10 and FIG. 11, the hook 52 of the support 16 is suspended from the suspension tool 94 of the second linear-motion member 106, whereby the support 16 is suspended from the second linear-motion member 106. By the first linear-motion member 104 linearly moving along the axis $A_5$ and by the second linear-motion member 106 linearly moving along the axis $A_6$, the movable portion 102 moves the support 16 and the reduction gear 202 supported by the support 16 in the horizontal direction along the axes $A_5$ and $A_6$.

According to the present embodiment, by linearly moving the movable portion 102 of the jig 100, the operator can move the reduction gear 202 suspended from the support 16 closer to and away from the attachment portion (the proximal end 216) of the robot 200 to which the reduction gear is to be attached. According to this configuration, similar as the above-described jig 10, it is not necessary to move the reduction gear 202 by the heavy machine, the work of replacing the reduction gear 202 can be made more efficient.

Further, in the present embodiment, the movable portion 102 includes the first linear-motion member 104 linearly movable along the axis $A_5$, and the second linear-motion member 106 linearly movable along the axis $A_6$. According to this configuration, the operator can more finely adjust the position of the reduction gear 202 by moving the reduction gear 202 suspended from the support 16 in a plurality of directions.

Figure 14:
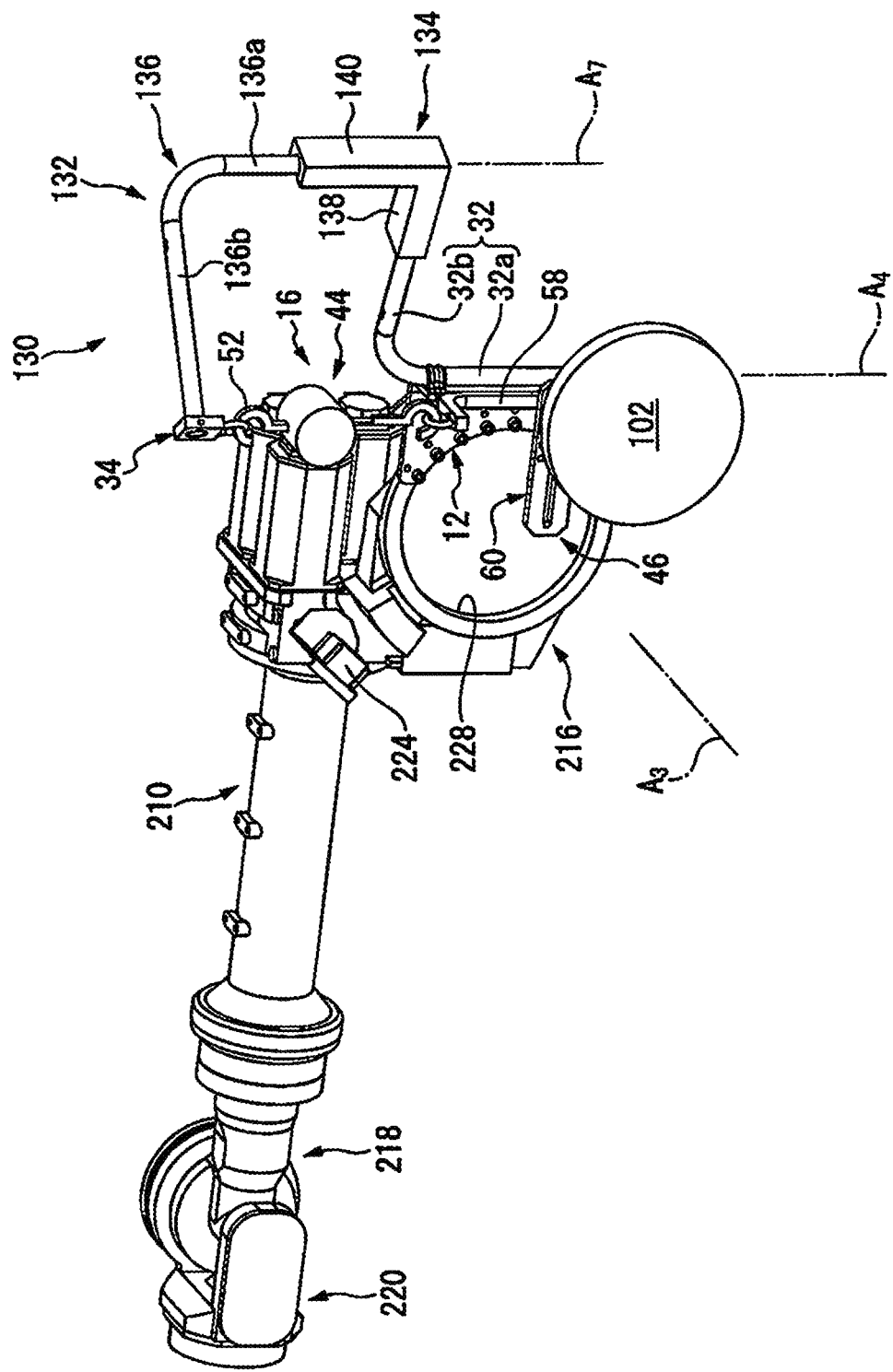
FIG. 14 illustrates a state in which a jig according to yet another embodiment is used to suspend the reduction gear in the gravity direction.
Figure 15:
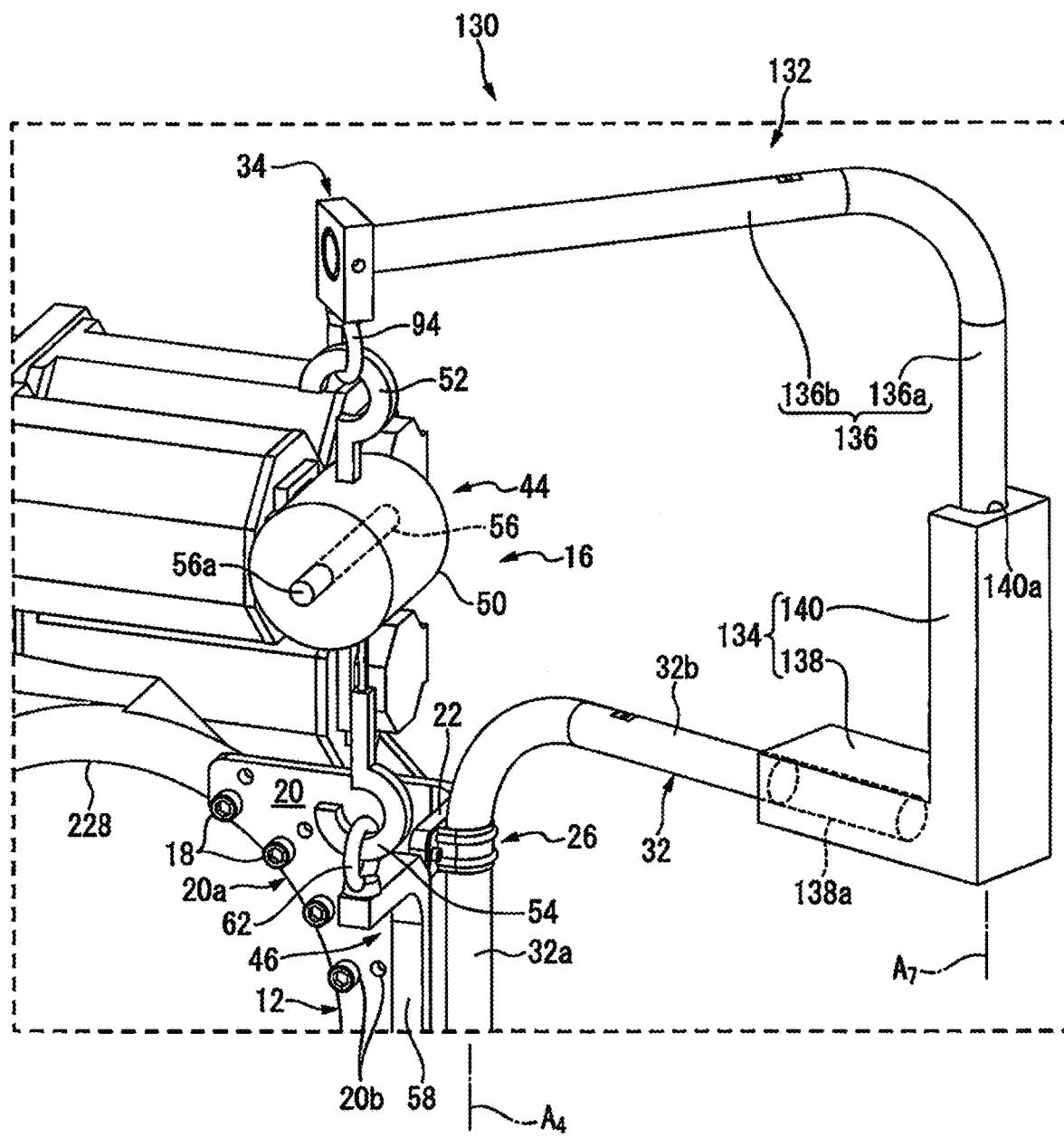
FIG. 15 is an enlarged view of a main portion of FIG. 14.

Next, a jig 130 according to still another embodiment will be described with reference to FIG. 14 and FIG. 15. The jig 130 differs from the above-described jig 10 in a movable portion 132. Specifically, the movable portion 132 includes the first rotating member 32, a support member 134, a second rotating member 136, and the linear-motion member 34. The first rotating member 32 is rotatably attached to the fixed portion 12 via the fitting 24 (FIG. 2) and the fitting 26, similar as the above-described jig 10.

The support member 134 is substantially L-shaped, and includes a first part 138 and a second part 140 orthogonal to the first part 138. The first part 138 extends substantially parallel to the second arm 32b of the first rotating member 32, and includes a receiving hole 138a extending linearly along the extension direction of the first part 138. The distal end of the second arm 32b is unrotatably received in the receiving hole 138a, whereby the support member 134 is fixed to the first rotating member 32.

Note that the first part 138 may be unrotatably fixed to the second arm 32b by a fastener such as a bolt, or the second arm 32b and the receiving hole 138a may be formed in polygonal shapes such that the second arm 32b unrotatably engages a wall surface of the receiving hole 138a. The second part 140 is formed integrally with the first part 138, and extends linearly upward from one end of the first part 138. The second part 140 is formed with a receiving hole 140a extending linearly in the extension direction of the second part 140.

The second rotating member 136 is attached to the first rotating member 32 so as to be rotatable about an axis $A_7$. Specifically, the second rotating member 136 includes a first arm 136a extending linearly along the axis $A_7$ and a second arm 136b extending linearly in a direction orthogonal to the axis $A_7$. The first arm 136a is rotatably received, at its lower end, in a receiving hole 140a formed in the second part 140 of the support member 134. Due to this, the second rotating member 136 is rotatable about the axis $A_7$. The axis $A_7$ is parallel to the axis $A_4$ and rotates about the axis $A_4$ together with the first rotating member 32.

The second arm 136b is inserted into the main body 38 of the linear-motion member 34 so as to contact the rolling elements 40 (FIG. 5) of the linear-motion member 34, whereby the linear-motion member 34 can linearly move along the second arm 136b. Note that, in the embodiment illustrated in FIG. 15, although the pair of stoppers 36 described above is not illustrated, in order to limit the movement range of the linear-motion member 34, the pair of stoppers 36 may be provided on the second arm 136b, similar as the above-described jig 10.

The support 16 is attached to the linear-motion member 34 of the movable portion 132. In the present embodiment, by the first rotating member 32 rotating around the axis $A_4$, by the second rotating member 136 rotating around the axis $A_7$, and by the linear-motion member 34 linearly moving along the second arm 136b, the movable portion 132 moves the support 16 and the reduction gear 202 supported by the support 16 in the horizontal direction.

According to the present embodiment, the operator can move the reduction gear 202 suspended from the support 16 closer to and away from the attachment portion (the proximal end part 216) in the robot 200 to which the reduction gear is to be mounted, by moving the movable portion 132 of the jig 130. According to this configuration, similar as the above-described jig 10, since it is not necessary to move the reduction gear 202 by the heavy machine, the work of replacing the reduction gear 202 can be made more efficient.

Further, in the present embodiment, the movable portion 132 includes the first rotating member 32 rotating about the axis $A_4$, and the second rotating member 136 rotating about the axis $A_7$. According to this configuration, the operator can easily rotate the reduction gear 202 of a heavy load in two directions by a relatively small force, and finely adjust the position of the reduction gear 202.

Note that, in the embodiments described above, the jigs 10, 70, 100, and 130 are fixed to the proximal end part 216 of the upper arm 210. However, the jig 10, 70, 100, or 130 can be fixed to the distal end part 214 of the lower arm 208. Such an embodiment is illustrated in FIG. 16 and FIG. 17.

Figure 16:
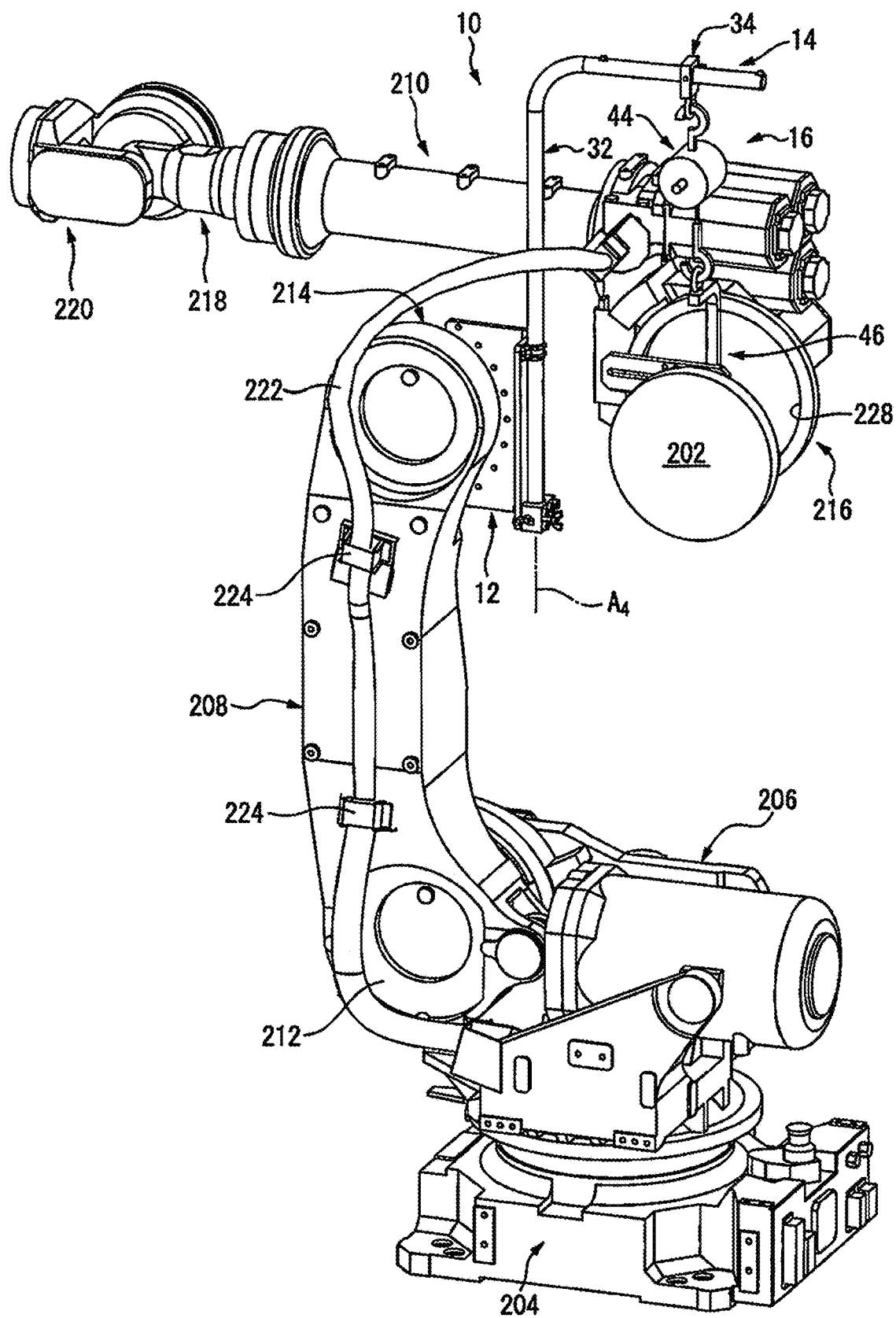
FIG. 16 illustrates a state in which the jig illustrated in FIG. 1 is mounted to a lower arm of the robot.
Figure 17:
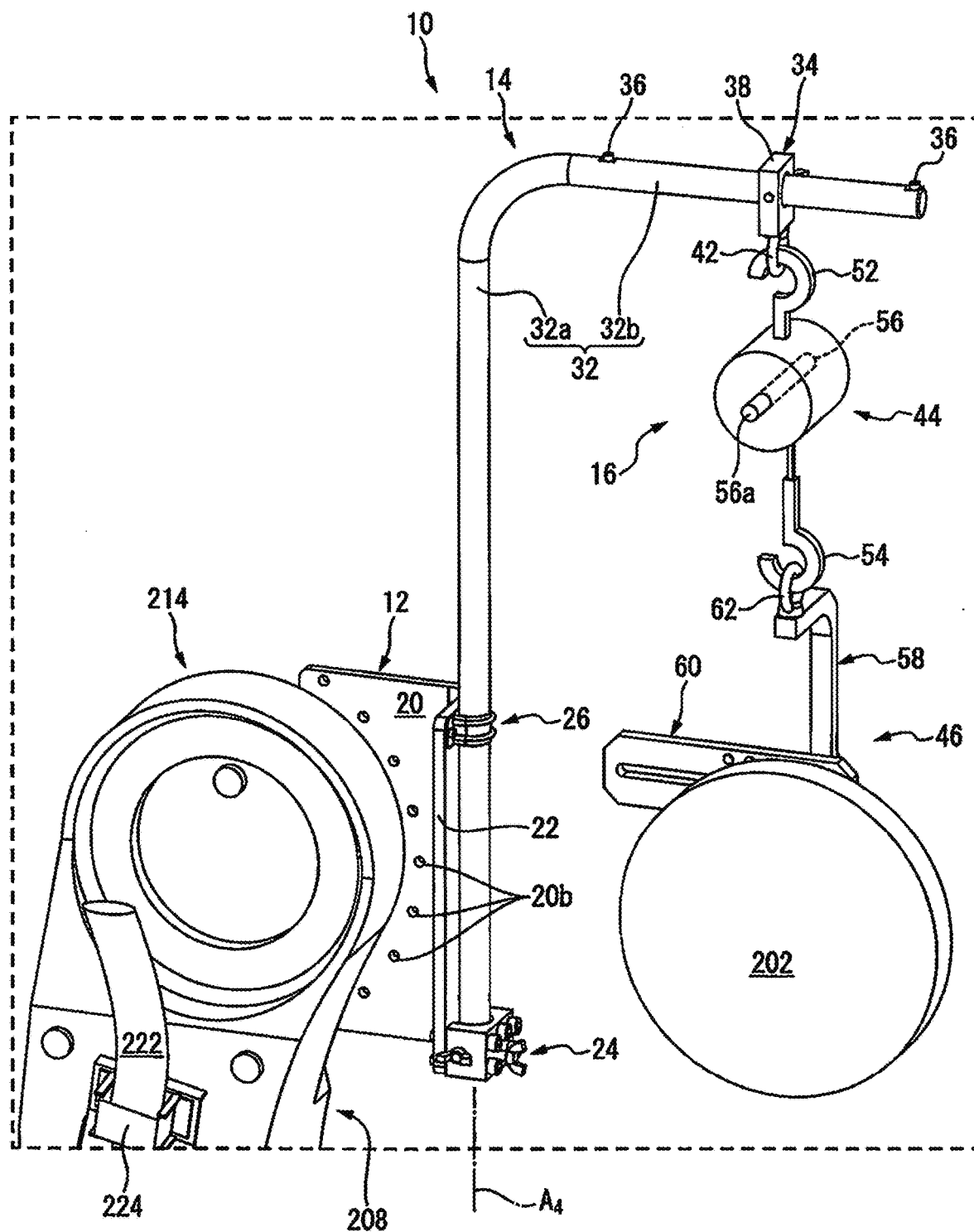
FIG. 17 is an enlarged view of a main portion of FIG. 16.

In the embodiment illustrated in FIG. 16 and FIG. 17, the fixed portion 12 of the jig 10 is detachably fixed to the distal end part 214 of the lower arm 208 by the fasteners 18. For example, fastening holes (not illustrated) for a predetermined application (e.g., for fastening the stopper) are formed in the distal end part 214 of the lower arm 208, and the fixed portion 12 can be fixed to the distal end part 214 by inserting the fasteners 18 into the through holes 20b of the fixed portion 12 so as to be fastened to the fastening holes formed in the distal end part 214.

In such an embodiment, similar as the above-described embodiments, by moving the movable portion 14 of the jig 10, the operator can move the reduction gear 202 suspended from the support 16 closer to and away from the attachment portion (the proximal end part 216) to which the reduction gear is to be mounted. It should be understood that the jig 70, 100, or 130 can be similarly fixed to the distal end part 214 of the lower arm 208.

Note that, for smooth rotation of the rotating member 32 or 136, rolling elements, a low-friction material, a lubricant, or the like may be provided in the hole 28 of the fitting 24, the through hole 30 of the fitting 26, or the receiving hole 140a described above. Further, in the jig 10 or 130, a locking mechanism may be provided that locks the rotating member 32 when the rotating member 32 is rotated by a predetermined angle (e.g., 180°) from the position illustrated in FIG. 1 and FIG. 2. Such a locking mechanism may be e.g. a snap-fit mechanism, and include a first engaging part provided at the rotating member 32 and a second engaging part provided at the fitting 24 or 26.

Similarly, in the jig 130, a locking mechanism may be provided that locks the second rotating member 136 at a predetermined angle with respect to the second part 140 of the support member 134. Such a locking mechanism may be e.g. a snap-fit mechanism, and include a first engaging part provided at the second rotating member 136 and a second engaging part provided at the second part 140.

Further, in the jig 10, a locking mechanism may be provided that locks the linear-motion member 34 at a predetermined position with respect to the second arm 32b. Similarly, in the jig 70 (or 100), a locking mechanism may be provided that locks the movable portion 76 (or the engaging section 110) at a predetermined position with respect to the rail 82. Further, in the jig 100, a locking mechanism may be provided that locks the second linear-motion member 106 at a predetermined position with respect to the rail 108. The locking mechanism for the linear-motion member 34, the movable portion 76, the engaging section 110, or the second linear-motion member 106 may be a snap-fit mechanism or may include a pair of magnets that attract each other.

In the embodiments described above, a case is described in which the fasteners 18 are used to fix the fixed portion 12 to the upper arm 210 or the lower arm 208. However, any member or structure may be employed that can fix the fixed portion 12 to the upper arm 210 or the lower arm 208. For example, the fixed portion 12 may be fixed to the upper arm 210 or the lower arm 208 by engagement between a first engaging part formed at the fixed portion 12 and a second engaging part formed at the upper arm 210 or the lower arm 208. Similarly, any member or structure may be employed in place of the fastener 64 or 66.

The suspending device 44 may be omitted from the support 16, and the mounting member 46 may be directly fixed to the movable portion 14, 76, 102, or 132. Further, the linear-motion member 34 may be omitted from the movable portion 14 or 132. The linear-motion member 34 may include a low-friction material, a lubricant, or the like, instead of the rolling elements 40. The mounting member 46 is not limited to the above-described configuration, but may have any structure attachable to the reduction gear 202. Similarly, the fixed portion 12 or 72 is not limited to the above-described configuration, but may have any structure attachable to the upper arm 210 or the lower arm 208.

In the above-described embodiments, the jig 10, 70, 100, or 130 is attached to the lower arm 208 or the upper arm 210 in order to replace the reduction gear 202 that connects the lower arm 208 and the upper arm 210. However, the jig 10, 70, 100, or 130 may be used to replace any reduction gear that connects a first constituent element and a second constituent element of the robot 200 so as to perform a speed-reduction operation, for example, a reduction gear that connects the rotary barrel 206 and the lower arm 208, or a reduction gear that connects the upper arm 210 and the wrist 220.

Although the present disclosure has been described above through the embodiments, the embodiments described above are not intended to limit the claimed invention.

The invention claimed is:

1. A jig configured to support a reduction gear when a second element of a robot is separated from a first element of the robot, the reduction gear being configured to connect the first element and the second element to each other so as to perform a speed-reduction operation, the jig comprising:
a fixed portion detachably attached to the first element or the second element;
a movable portion attached to the fixed portion so as to be rotationally or linearly movable, and includes a rotating member attached to the fixed portion; and
a support attached to the movable portion and configured to suspend the reduction gear in a gravity direction to support the reduction gear,
wherein the rotating member includes:
a first arm attached to the fixed portion so as to be rotatable about an axis, and extending along the axis; and
a second arm extending from the first arm in a direction intersecting with the axis, the support being attached to the second arm.

2. The jig of claim 1, wherein the movable portion rotates with respect to the fixed portion to move the support in a horizontal direction.

3. The jig of claim 2, wherein the movable portion includes:
a first rotating member attached to the fixed portion; and
a second rotating member attached to the first rotating member.

4. The jig of claim 2, wherein the movable portion rotates and linearly moves with respect to the fixed portion to move the support in the horizontal direction.

5. The jig of claim 1, wherein the movable portion linearly moves with respect to the fixed portion to move the support in a horizontal direction.

6. The jig of claim 5, wherein the movable portion includes:
a first linear-motion member attached to the fixed portion; and
a second linear-motion member attached to the first linear-motion member.

7. The jig of claim 1, wherein the support includes a mounting member detachably attached to the reduction gear and configured to be reciprocated along a gravity direction.

8. The jig of claim 1, wherein the rotating member is configured to rotate relative to the fixed portion and the movable portion comprises a linear-motion member, and the linear-motion member is configured to linearly move along the rotating member.

9. A method of replacing a reduction gear using a jig configured to support the reduction gear when a second element of a robot is separated from a first element of the robot, the reduction gear being configured to connect the first element and the second element to each other so as to perform a speed-reduction operation, the method comprising:
detachably attaching a fixed portion to the first element or the second element;
attaching a movable portion to the fixed portion so as to be rotationally or linearly movable, and including a rotating member attached to the fixed portion;
attaching a support to the movable portion and configured to suspend the reduction gear in a gravity direction to support the reduction gear;
fixing the support to the reduction gear mounted to one of the first element and the second element separated from each other;
removing the reduction gear from the one of the first element and the second element and suspending the reduction gear in the gravity direction by the support to support the reduction gear; and
moving the reduction gear supported by the support away from the one of the first element and the second element by moving the movable portion with respect to the fixed portion,
wherein the rotating member includes:
a first arm attached to the fixed portion so as to be rotatable about an axis, and extending along the axis; and
a second arm extending from the first arm in a direction intersecting with the axis, the support being attached to the second arm.

10. The method of claim 9, comprising:
removing the reduction gear from the support after moving the reduction gear;
fixing a new reduction gear to the support and suspending the new reduction gear in the gravity direction by the support to support the new reduction gear;
moving the new reduction gear supported by the support toward the one of the first element and the second element by moving the movable portion with respect to the fixed portion; and
mounting the new reduction gear to the one of the first element and the second element.

* * * * *